US00RE38477E

(19) United States
(12) Reissued Patent
Tohgi

(10) Patent Number: US RE38,477 E
(45) Date of Reissued Patent: Mar. 30, 2004

(54) PERFORMANCE INFORMATION ANALYZER AND CHORD DETECTION DEVICE ASSOCIATED THEREWITH

(75) Inventor: Yutaka Tohgi, Hamakita (JP)

(73) Assignee: Yamaha Corporation (JP)

(21) Appl. No.: 09/120,957

(22) Filed: Jul. 23, 1998

Related U.S. Patent Documents

Reissue of:
(64) Patent No.: 5,539,146
Issued: Jul. 23, 1996
Appl. No.: 08/223,611
Filed: Apr. 6, 1994

(30) Foreign Application Priority Data

Apr. 9, 1993 (JP) ..... 5-083043

(51) Int. Cl.[7] ..... G10H 1/38
(52) U.S. Cl. ..... 84/650; 84/669; 84/DIG. 22
(58) Field of Search ..... 84/609–614, 634–638, 84/649–652, 666–669, 453, 454, 462, 477 R, 478, DIG. 22

(56) References Cited

U.S. PATENT DOCUMENTS

| | | | | | |
|---|---|---|---|---|---|
| 4,506,580 | A | * | 3/1985 | Koike | 84/477 R X |
| 4,546,687 | A | * | 10/1985 | Minami | 84/477 R X |
| 4,864,907 | A | * | 9/1989 | Oguri | 84/637 |
| 4,887,504 | A | * | 12/1989 | Okamoto et al. | 84/715 |
| 4,951,544 | A | * | 8/1990 | Minamitaka | 84/613 |
| RE33,607 | E | * | 6/1991 | Yuzawa et al. | 84/613 X |
| 5,136,914 | A | * | 8/1992 | Letts et al. | 84/619 |
| 5,202,526 | A | * | 4/1993 | Ohya | 84/637 X |
| 5,216,188 | A | | 6/1993 | Shibukawa | 84/637 |
| 5,218,153 | A | * | 6/1993 | Minamitaka | 84/613 |
| 5,225,618 | A | * | 7/1993 | Wadhams | 84/634 X |
| 5,459,281 | A | | 10/1995 | Shibukawa | 84/637 |

FOREIGN PATENT DOCUMENTS

| | | | |
|---|---|---|---|
| EP | 0351862 A2 | * | 1/1990 |
| EP | 0351862 | * | 1/1990 |
| JP | 57-13489 | | 1/1982 |
| JP | 59-195281 | | 11/1984 |
| JP | 62-19898 | * | 1/1987 |
| JP | 62-42517 | * | 9/1987 |
| JP | 3-43638 | * | 7/1991 |
| JP | 03164796 A | | 7/1991 |
| JP | 03-213899 | | 9/1991 |
| JP | 4-30197 | | 2/1992 |
| JP | 05027761 A | | 2/1993 |
| JP | 05027762 A | | 2/1993 |
| JP | 05-040474 | | 2/1993 |

* cited by examiner

*Primary Examiner*—Stanley J. Witkowski
(74) *Attorney, Agent, or Firm*—Rossi & Associates

(57) ABSTRACT

A performance information analyzer wherein one of tone pitch information data applied thereto in response to progress of performance of a musical tune is analyzed into one of plural performance parts on a basis of a difference in tone pitch between the one of the tone pitch information data and a reference tone pitch information data previously assigned to a predetermined part of the plural performance parts during prior analysis of the tone pitch information and the other tone pitch information data are analyzed into the other performance parts on a basis of a difference in tone pitch between the analyzed tone pitch information data and each of the other tone pitch information data.

62 Claims, 18 Drawing Sheets

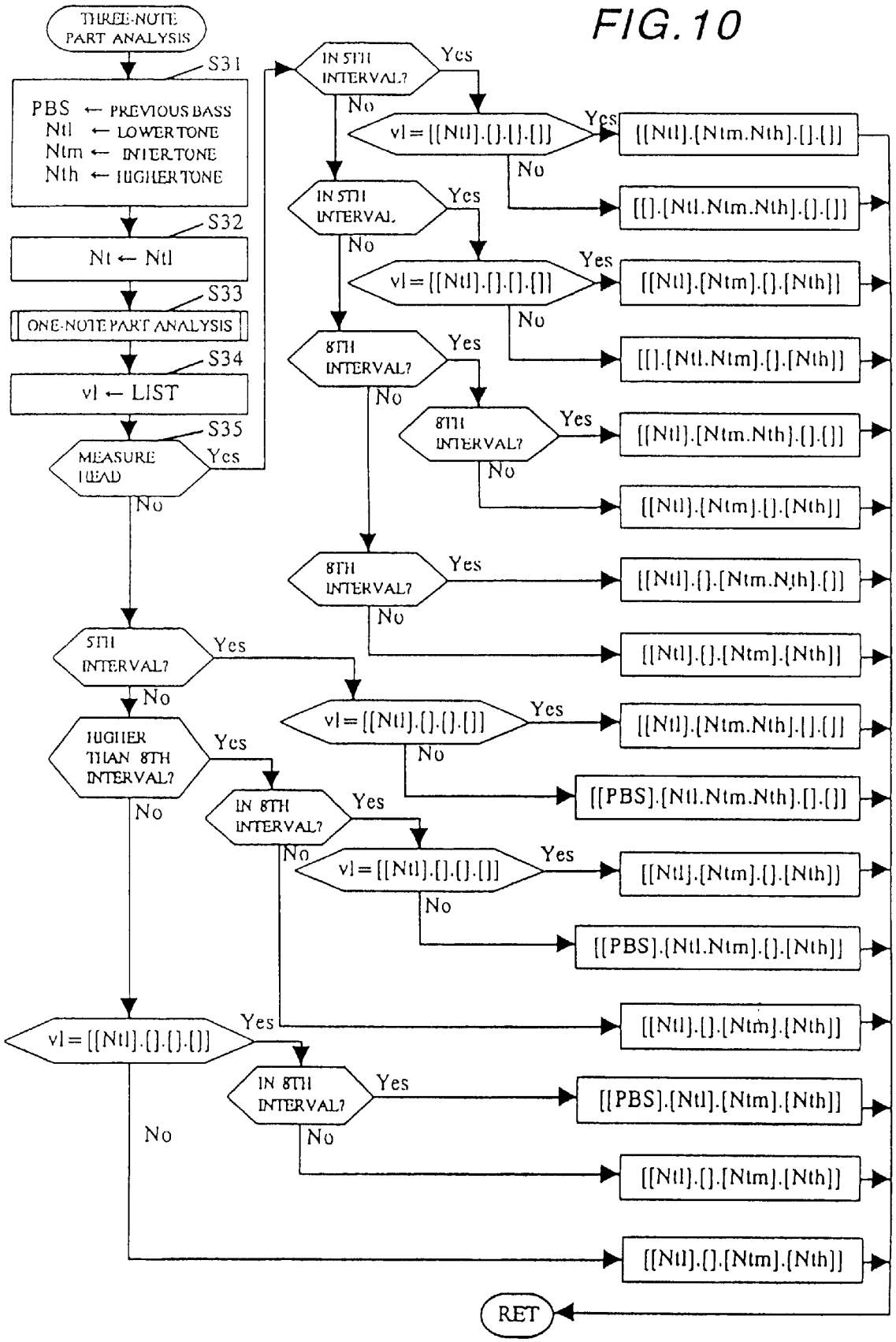
FIG. 10
THREE-NOTE PART ANALYSIS
S31
PBS ← PREVIOUS BASS
Ntl ← LOWER TONE
Ntm ← INTER TONE
Nth ← HIGHER TONE
S32
Nt ← Ntl
S33
ONE-NOTE PART ANALYSIS
S34
vl ← LIST
S35
MEASURE HEAD
Yes
No
IN 5TH INTERVAL?
vl = [[Ntl].[].[].[]]
[[Ntl].[Ntm.Nth].[].[]]
[[].[Ntl.Ntm.Nth].[].[]]
[[Ntl].[Ntm].[].[Nth]]
[[].[Ntl.Ntm].[].[Nth]]
8TH INTERVAL?
[[Ntl].[Ntm.Nth].[].[]]
[[Ntl].[Ntm].[].[Nth]]
[[Ntl].[].[Ntm.Nth].[]]
[[Ntl].[].[Ntm].[Nth]]
5TH INTERVAL?
HIGHER THAN 8TH INTERVAL?
IN 8TH INTERVAL?
[[PBS].[Ntl.Ntm.Nth].[].[]]
[[PBS].[Ntl.Ntm].[].[Nth]]
[[PBS].[Ntl].[Ntm].[Nth]]
RET FIG. 12 (Amended)
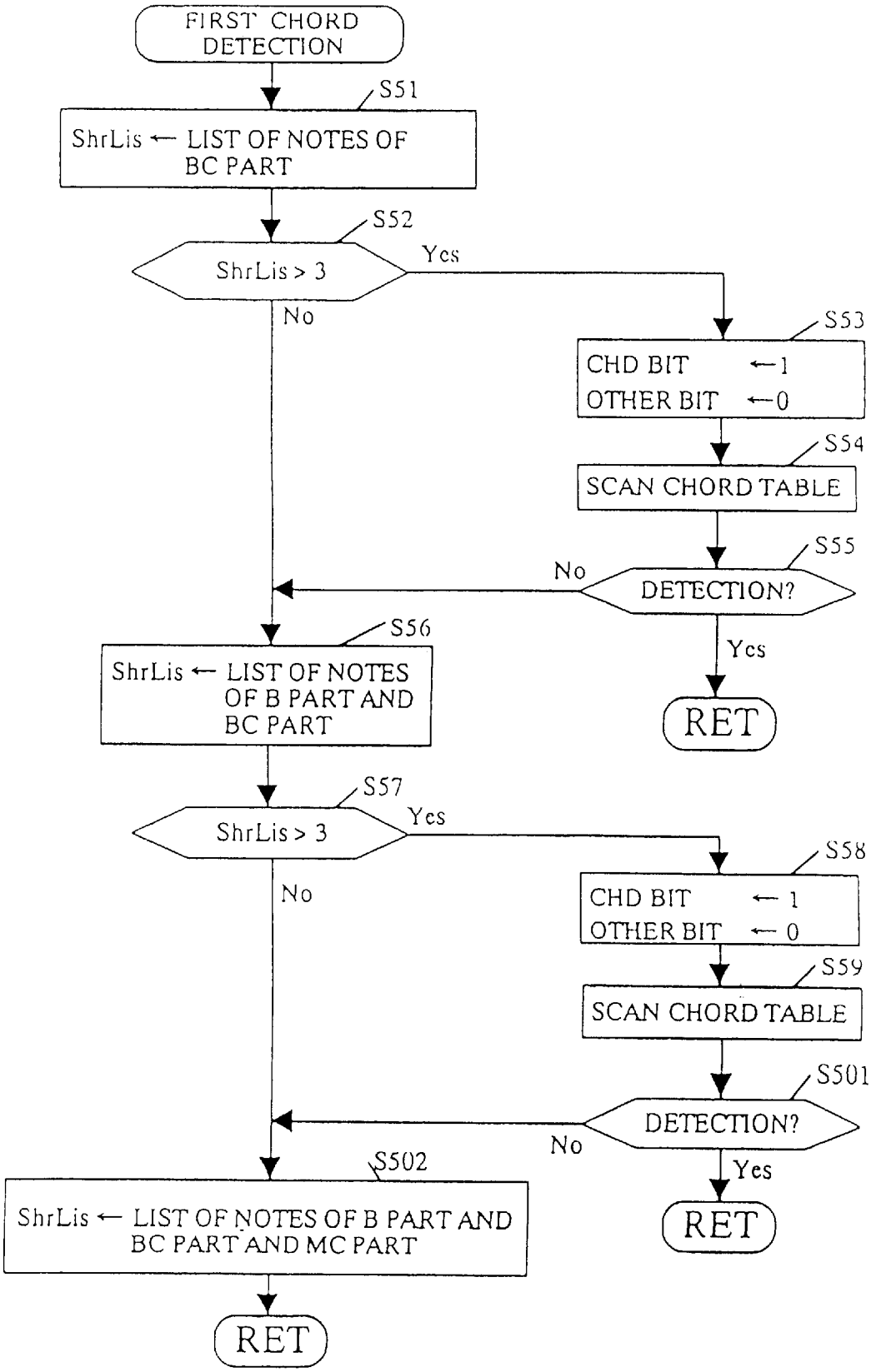

FIG. 14

CHORD TABLE

| | | TONE PITCH | | | | | | | | | | | |
|---|---|---|---|---|---|---|---|---|---|---|---|---|---|
| | | C | C# | D | D# | E | F | F# | G | G# | A | A# | B |
| CHORD | C | 1 | 0 | 0 | 0 | 1 | 0 | 0 | 1 | 0 | 0 | 0 | 0 |
| | Cm | 1 | 0 | 0 | 1 | 0 | 0 | 0 | 1 | 0 | 0 | 0 | 0 |
| | C7 | 1 | 0 | 0 | 0 | 1 | 0 | 0 | 1 | 0 | 0 | 1 | 0 |
| | ⋮ | | | | | | | | | | | | |

PERFORMANCE INFORMATION ANALYZER AND CHORD DETECTION DEVICE ASSOCIATED THEREWITH

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a performance information analyzer adapted for use in performing apparatus such as an electronic musical intrument, an electronic piano player, an electronic musical multimedia system or the like, and more particularly to a performance information analyzer for analyzing performance information including a plurality of tone pitch information data of a musical tune into a plurality of performance parts and a chord detection device associated with the performance information analyzer for detecting a chord on a basis of the analyzed performance parts.

2. Discussion of the Prior Art

In recent years, there has been proposed an electronic musical instrument for harmonizing automatic accopaniment with performance played on a keyboard. In this kind of electronic musical instruments, it is required to detect a chord for determining a tone pitch of the accompaniment tone. For this reason, the chord is determined on a basis of performance information applied from the keyboard or key-codes of depressed keys of the keyboard. In general, melody performance is played at a higher tone area of the keyboard where mainly key-codes of non-harmonic tones relative to the chord are detected. Accordingly, the keyboard is immaginarily divided into a left-hand key area for the lower tone and a right-hand key area for the higher tone so that a chord is detected on a basis of key-codes of depressed keys at the left-hand key area.

As mentioned above, there is a tone area suitable for detection of the chord in a case that the chord is detected on a basis of tone pitch information such as the key-codes. Since the tone area changes in accordance with performance of a musical tune, there has been proposed a method capable of enhancing accuracy in detection of the chord under control or a manual switch arranged to be operated by a user for changing a boundary between the left-hand key area and the right-hand key area. In such an electronic musical instrument, however, the user is obliged to operate the manual switch during performance of the musical tune, resulting in a difficulty in operation of the manual switch.

On the other hand, almost all musical tunes can be divided into a plurality of performance parts such as a melody part or a bass part which include an appropriate performance part for detection of the chord. Therefore, if performance information can be analyzed into the plurality of performance parts, it is possible to enhance accuracy in detection of the chord in accordance with the performance part Assuming that automatic performance information could be analyzed into a pluarlity of performance parts, only a desired performance part can be muted to effect the automatic performance, and a function (so called a minus-one function) capable of harmonizing the keyboard performance with the automatic performace can be provided in a simple manner for practice of the user. Furthermore, in case the performance information could be analyzed into the plurality of performance parts as described above, it is able to add another melody to the performance information or to substitute another melody for a portion of the performance part for effecting an automatic arrangement.

SUMMARY OF THE INVENTION

It is, therefore, a primary object of the present invention to provide a performance information analyzer capable of automatically analyzing performance information of a musical tune into a plurality of performance parts or musical parts and a chord detection device associated with the information analyzer for enhancing accuracy in detection of a chord based on the analyzed performance parts:

a performance information analyzer which comprises input means provided to be applied with tone pitch information data in response to progress of performance of a musical tune; and analysis means for analyzing one of the tone pitch information data into one of plural performance parts based on a difference in tone pitch between the one of the tone pitch information data and a reference tone pitch information data previously assigned to a predetermined part of the plural performance parts during prior analysis of the tone pitch information and for analyzing the other tone pitch information data into the other performance parts based on a difference in tone pitch between the analyzed tone pitch information data and each of the other tone pitch information data.

BRIEF DESCRIPTION OF THE DRAWINGS

Additional objects, features and advantages of the present invention will be more readily appreciated from the following detailed description of a preferred embodiment thereof when considered with reference to the accompanying drawings, in which:

FIG. 10 is a flow chart of a three-note part analysis routine of the program;

FIG. 12 is a flow chart of a first chord detection routine of the program;

FIG. 14 is a view showing a chord table;

DESCRIPTION OF THE PREFERRED EMBODIMENT

Figure 1:
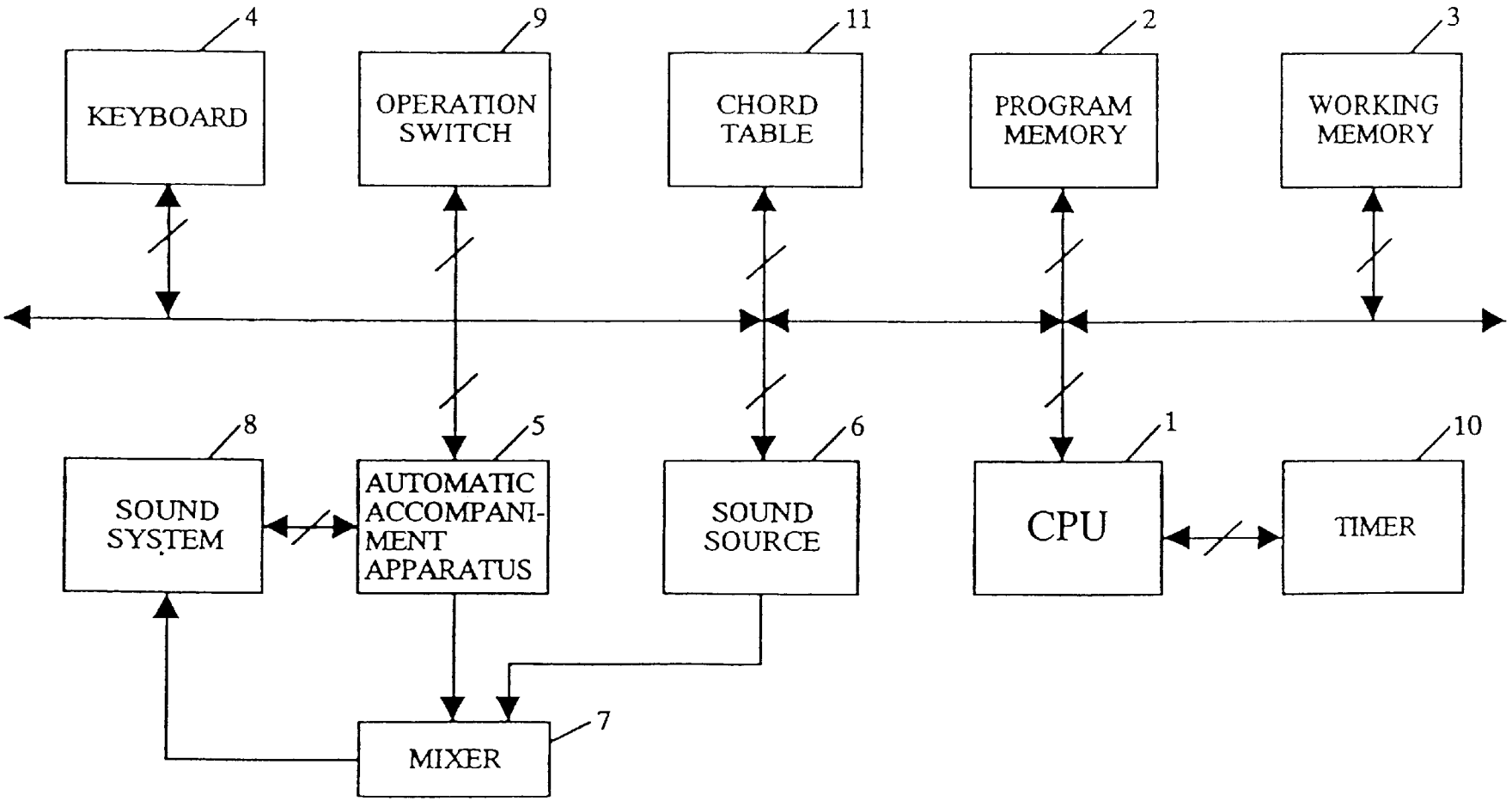
FIG. 1 is a block diagram of an electronic musical instrument provided with a performance information analyzer and a chord detection device in accordance with the present invention.

In FIG. 1 of the drawings, there is schematically illustrated a block diagram of an electronic musical instrument provided with a performance information analyzer and a chord detection apparatus associated therewith in accordance with the present invention, which includes a central processing unit or CPU 1 arranged to use a working area of a working memory 3 for executing a control program stored in a program memory 2 in the form of a read-only memory. The electronic musical instrument has a keyboard 4 to be played by a user for keyboard performance and an automatic accompaniment apparatus to be activated under control of the CPU 1 for harmonizing automatic accompaniment with the keyboard performance.

When applied with a key-code with a key-on signal or a key-off signal in response to depression or release of keys on the keyboard 4, the CPU 1 applies the key-code with a note-on or a note-off to a sound source 6 for generating or muting a musical tone in accordance with the keyboard performance. The automatic accompaniment apparatus 5 is arranged to memorize a plurality of accompaniment patterns in accordance with the style of a musical tune and to select the memorized accompaniment patterns in response to a start signal applied thereto from the CPU 1 for effecting automatic performance at the selected pattern. When applied with a stop signal from the CPU 1, the automatic accompaniment apparatus 5 is deactivated to stop the automatic preformance. When a chord is designated by the CPU 1 in accordance with progress of the keyboard performance, the automatic accompaniment apparatus 5 generates a musical tone signal of the accompaniment tone at a tone pitch defined by the selected chord and a bass tone. The musical tone signal from the automatic accompaniment apparatus 5 is mixed with the musical tone signal from the sound source 6 by means of a mixer 7 and applied to a sound system 8 where the mixed musical tone signals are converted into analog signals and amplified to be generated as a musical sound.

The electronic musical instrument has an operation switch assembly 9 which includes various switches such as a start/stop switch for designating start or stop of the automatic accompaniment, a set switch for setting the style selection at the automatic accompaniment apparatus 5 and for setting a performance tempo, a set switch for setting a tone color at the sound source 6 and the like. Thus, the automatic accompaniment apparatus 5 effects the automatic accompaniment on a basis of a style and a tempo selected by the operation switch 9. The CPU 1 is also arranged to set the selected tempo in a timer 10 which applies an interruption signal to the CPU 1 at each 8th-note in response to the selected tempo. When applied with the interruption signal from the timer 10, the CPU 1 executes an interruption processing for counting the tempo at each 8th-note duration from the start of the automatic accompaniment and for detecting a timing of a strong beat or weak beat in a measure and a timing of a measure line. Thus, the CPU 1 analyzes the performance part based on a key-code generated by depression of keys on the keyboard 4 and detects a chord on a basis of a resultant of the analysis for applying information of the chord to the automatic accompaniment apparatus 5.

As shown in FIG. 14, a chord table 11 is designed to store each type of chords and chord composite tones related to a chord of the C tone. The chord composite tones each are represented by data of twelve bits corresponding with twelve pitch names. The bit corresponding with the chord composite tone is memorized as "1", and other bits each are memorized as "0". For detection of a chord, "1" is set at the bit corresponding with the pitch name of a key-code for chord detection in a register of twelve bits, and the register is shifted in circulation to detect a chord by matching with the data of twelve bits on the chord table 11. Thus, the chord type data is obtained by matching with the data of chord table 11, and the chord root data is obtained by the number of shifts of the register.

In performance part analysis of this embodiment, a key-depression tone of the keyboard 4 is analyzed into a melody part for providing a melody at a higher part, a melody chord part for adding a harmony to the melody, a bass part for providing a bass at a lower part and a bass chord part for adding a harmoney to the bass. Additionally, one-note part analysis, two-note part analysis, three-note part analysis and four-or-more-note part analysis are conducted in accordance with the number of depressed keys on the keyboard. The condition for analysis to the four parts is determined on a basis of a combination of the tone pitch, presence of a measure head at a current timing, a strong beat tone or a weak beat tone at the current timing, an interval relative to a previous bass part tone, an interval relative to a previous melody part tone and the like. In accordance with these conditions, a part to which a current key code belongs is determined. Accordingly, the four pans will change in accordance with performance information.

In such a manner as described above, a key code is assigned to respective parts in accordance with progress of performance. In this instance, if the key code is assigned to the bass chord part, a chord is detected on a basis of the bass code part. If there is not any key code in the bass chord part, a chord is detected on a basis of the melody code part. In addition, the automatic accompaniment apparatus 5 is arranged to be applied with a bass tone of the bass part obtained by the performance part analysis and the detected chord. When the applied bass tone is different from the root of the chord, the automatic accompaniment apparatus 5 causes the bass tone to sound at first. This means that the bass tone is sounded in respect to a non-root-bass-chord (an inverted chord) where the bass tone is different from the prime root of the chord.

In analysis of a key code to the four parts, the respective parts relative to the key code are represented by the following formula (1).

$$[[a_1], [b_1. b_2 \ldots], [c_1. c_2. \ldots], [d_1. d_2. \ldots]] \quad (1)$$

where "[ ]" designates a parenthsis of each element of the performance parts, "." designates a period of the respective elements, $a_1$ is a key code of the bass part for one tone, $b_1$, $b_2 \ldots$ designate each key code of the bass chord part, $c_1$, $c_2 \ldots$ designate each key code of the melody chord part, $d_1$, $d_2 \ldots$ designate each key code of the melody part, and the whole formula (1) represents a whole list (hereinafter referred simply to a whole analysis list) including each list of the key codes of the respective parts.

Figure 2:
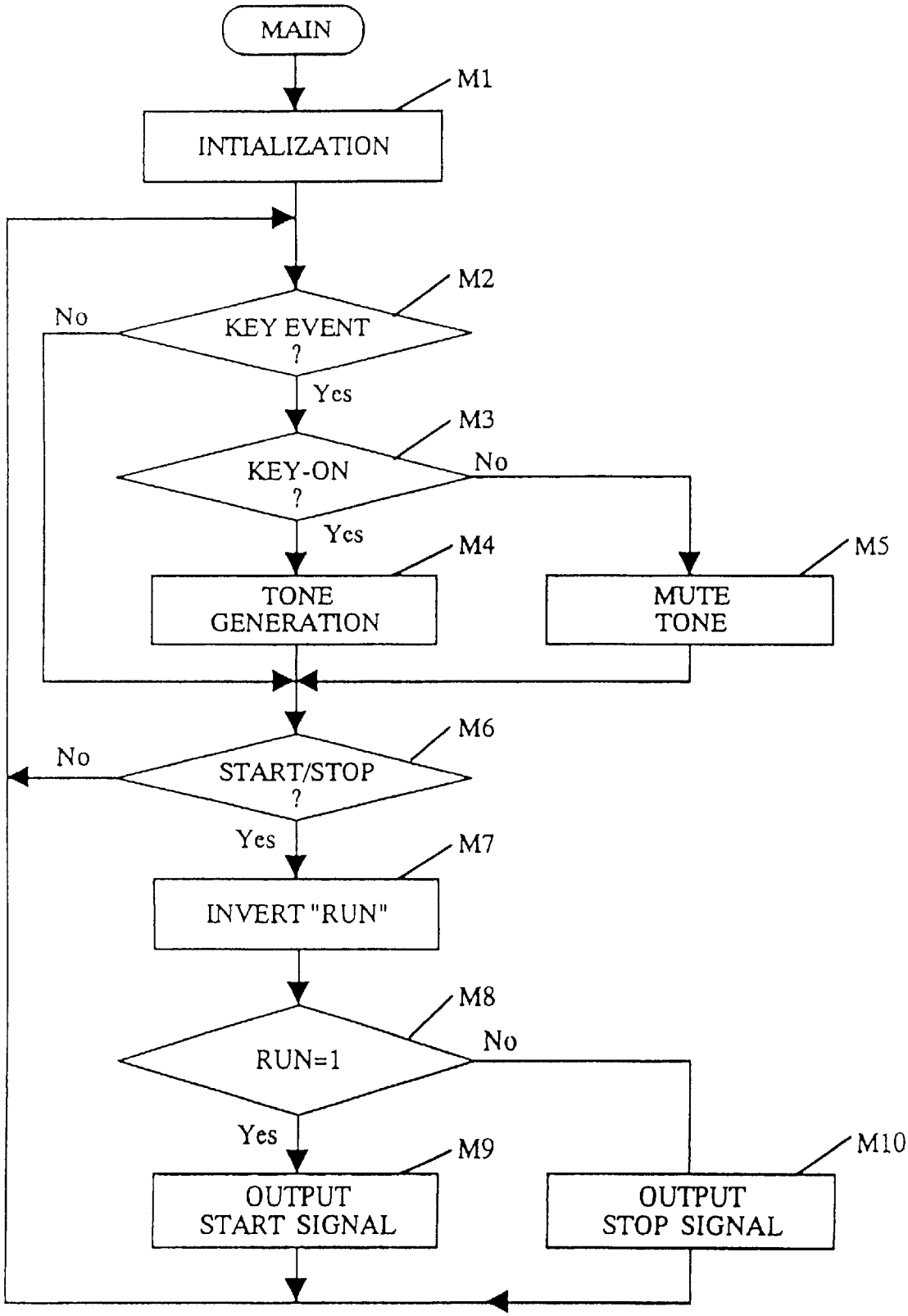
FIG. 2 is a flow chart of a main routine or a control program to be executed by a central processing unit shown in FIG. 1.

Illustrated in FIG. 2 is a flow chart of a main routine of a control program to be executed by the CPU 1. Each flow chart of sub-routines and interruption routines of the control program is illustrated in FIGS. 3 to 13. Hereinafter, operation of the electronic musical instrument will be described in detail with reference to the flow charts. In the following explanation, the key code applied from the keyboard is simply referred to "an input tone", and the key code indicative of each of the listed elements of the parts is simply referred to "a detection tone". In the flow charts, the bass part, bass chord part, melody chord part, and melody part are simply represented by "B part", BC part", "MC part", "M part, respectively. Furthermore, respective registers, flags and lists in the following description are represented as listed below.

BCLST: List of a current bass chord part,

BSKC: Detection tone of a bass part to be applied to the automatic accompaniment apparatus, but1Lis: List of depressed key tones wherein a lowermost tone is removed, but1U15: List of tones with a 5th interval from lower depressed key tones wherein a lowermost tone is removed, CHRD: Detected chord information to be applied to the automatic accompaniment apparatus, LIST: Whole analysis list, Nt: Input tone to be analyzed in analysis of one-note music part, N11: Lower or lowest tone of depressed keys, Nth: Higher tone of depressed keys, Ntm: Intermediate tone of depressed keys, Ntm2: Intermediate tone of depressed key, NtLis: List of depressed key tones, PBCtop: Highest detection tone of a previous bass chord part, PBCLST: List of detection tones of the previous bass chord part, PBS: Detection tone of a previous bass part, PMbtm: Lowest detection tone of a previous melody part, PMCtop: Highest detection tone of a previous melody chord part, RUN: Flag indicative of start/stop of automatic accompaniment, rLis: List of tones of depressed keys wherein a predetermined tone is removed, ShrLis: List of notes of the bass chord part and melody chord part with redundant existence of the same notes omitted, UndInt5: List of tones with a 5th interval from a lower depressed key tone, v1: Whole analysis 11st of one-none part immediately after analysis.

When the electronic musical instrument is connected to an electric power source, the CPU 1 is activated to initiate execution of the main routine shown in FIG. 2. At step M1, the CPU 1 initializes respective flags and variables in registers and causes the program to proceed to step M2 where it deteremines presence of a key event on the keyboard 4. If there is not any key event, the CPU 1 causes the program to proceed to step M6. If the key event is present, the CPU 1 causes the program to proceed to step M3 where it determines whether the key event is a key-on event or not. If the answer at step M3 is "Yes", the program proceeds to step M4 where the CPU 1 executes processing for generation of a musical tone and causes the program to proceed to step M6. If the answer at step M3 is "No", the program proceeds to step M5 where the CPU 1 executes processing for mute of a musical tone and causes the program to proceed to step M6.

At step M6, the CPU 1 determines whether the start/stop switch 9 is being operated or not. If the answer at step M6 is "No", the program returns to step M2. If the answer at step M6 is "Yes", the CPU 1 inverts the flag RUN at step M7 and determines at step M8 whether the flag RUN is "1" or not. If the answer at step M8 is "Yes", the program proceeds to step M9 where the CPU 1 applies a start signal to the automatic accompaniment apparatus 5 and returns the program to step M2. If the answer at step M8 is "No", the program proceeds to step M10 where the CPU 1 applies a stop signal to the automatic accompaniment apparatus 5 and returns the program to step M2. With the foregoing processing, generation or mute of a musical tone in performance of the keyboard is carried out, and start or stop of the automatic accompaniment apparatus is effected under control or the operation switch 9.

Figure 3:
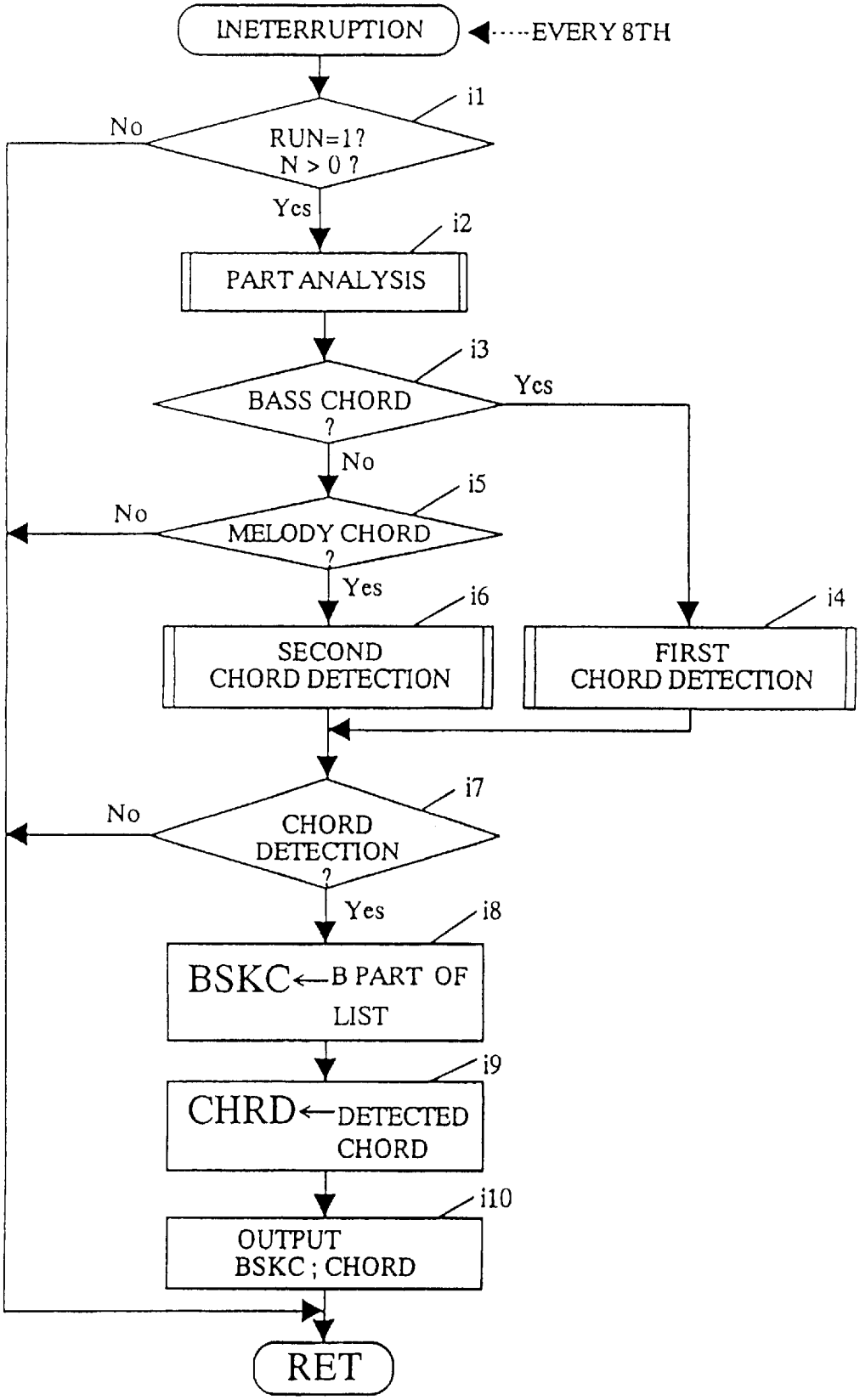
FIG. 3 is a flow chart of an interruption routine of the program.

When applied with an interruption signal from the timer 10 at each 8th-note, the CPU 1 initiates execution of the interruption routine shown in FIG. 3. At step i1 of the interruption routine, the CPU 1 determines whether "RUN"is "1" or not and whether the number N of depressed keys is "0" or not. If the answer at step i2 is "No", the program returns to the main routine shown in FIG. 2. If the answer at step i1 is "Yes", the program proceeds to step i2 where the CPU 1 executes a performance part analysis routine shown in FIG. 4. After execution of the performance part analysis routine, the program proceeds to step 13 where the CPU 1 determines whether a detection tone of the bass code part is present or not. If the answer at step i3 is "Yes", the program proceeds to step i4 where the CPU 1 executes a first chord detection routine shown in FIG. 12 on a basis of the bass chord and causes the program to proceed to step i7 after execution of the first chord detection routine. If the answer at step i3 is "No", the program proceeds to step i5 where the CPU 1 determines whether a detection tone of the melody chord part is present or not. If the answer at step 15 is "No", the program retruns to the main routine shown in FIG. 2. If the answer at step i5 is "Yes", the program proceeds to step i6 where the CPU 1 executes a second chord detection routine shown in FIG. 13 on a basis of the melody chord and causes the program to proceed to step i7 after execution of the second chord detection routine.

With the above processing, the detection tone of the bass code part or the melody chord part is detect a chord based on the whole analysis list LIST obtained by analysis of the performance parts. In this instance, the chord detection is conducted firstly on a basis of the bass chord part and secondly on a basis of the melody chord part if there is not any detection tone in the bass chord part.

When the program proceeds to step i7, the CPU 1 determines whether the chord detection has been effected or not. If the CPU 1 fails to detect the chord the program returns to the main routine. If the chord detection has been effected, the CPU 1 sets at step i8 an element or one detection tone of the bass part as the detection tone BSKC and sets the detected chord information as the chord information CHORD. Thus, the CPU 1 applies at step i10 the detection tone BSKC and chord information CHORD to the automatic accompaniment apparatus 5 and returns the program to the main routine.

Figure 4:
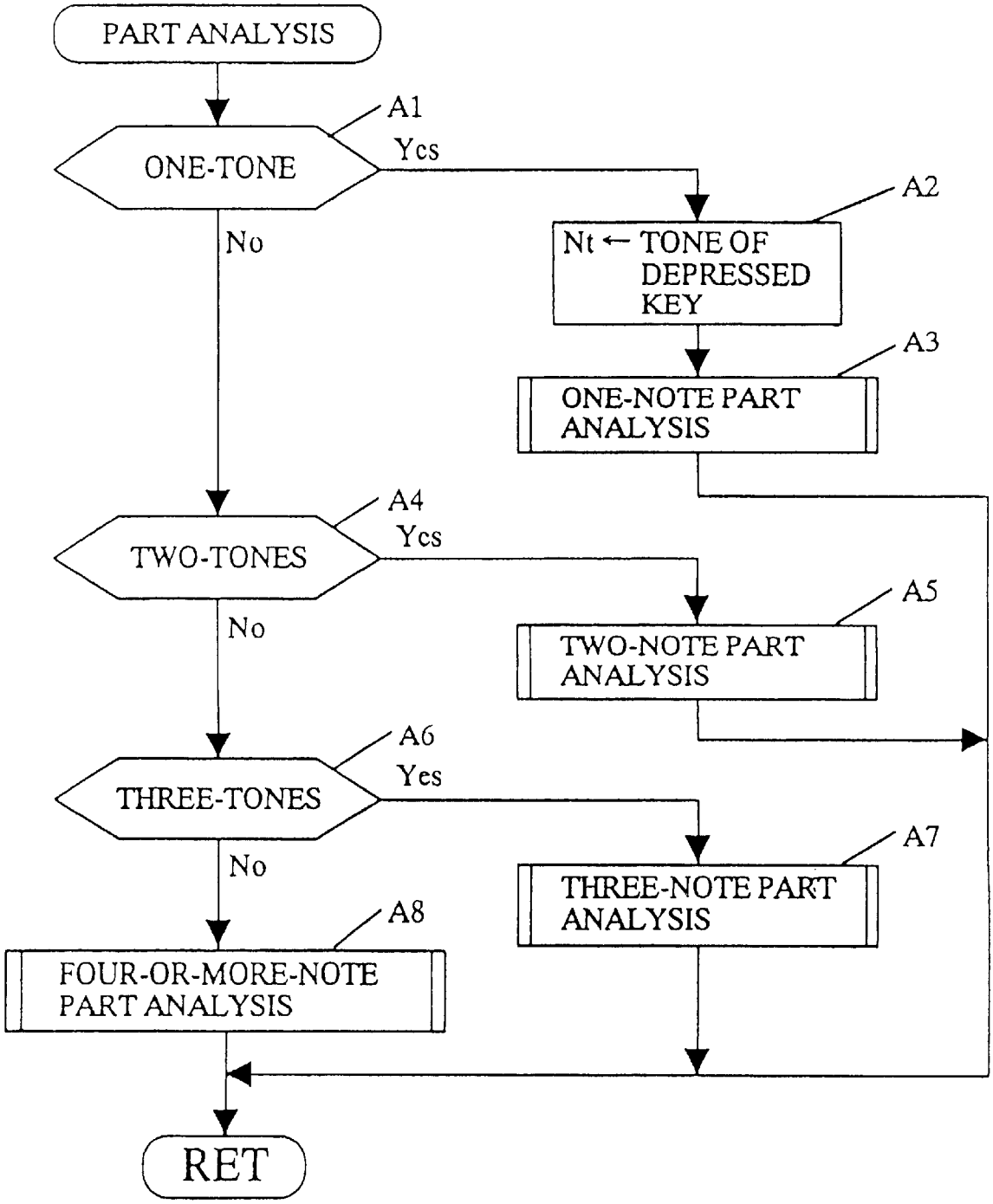
FIG. 4 is a flow chart of a performance part analysis routine of the program.

In the performance part analysis routine shown in FIG. 4, the CPU 1 determines the number of depressed key tones respectively at step A1, A4, A6, A8. When the number of depressed key tones is one-tone, the program proceeds to step A2 where the CPU 1 sets a key code of the depressed key tone as the input tone Nt and executes at step A3 a one-note part analysis routine shown in FIG. 5. When the number of depressed key tones is two-tones, the program proceeds to step A5 where the CPU 1 executes a two-note part analysis routine shown in FIG. 9. When the number of depressed key tones is three-tones, the program proceeds to step A7 where the CPU 1 executes a three-note part analysis routine shown in FIG. 10. When the number of depressed key tones is more than four tones, the program proceeds to step A8 where the CPU 1 executes a four-or-more-note part analysis routine shown in FIG. 11. After execution of the respective analysis routines, the program returns to the main routine.

Figure 5:
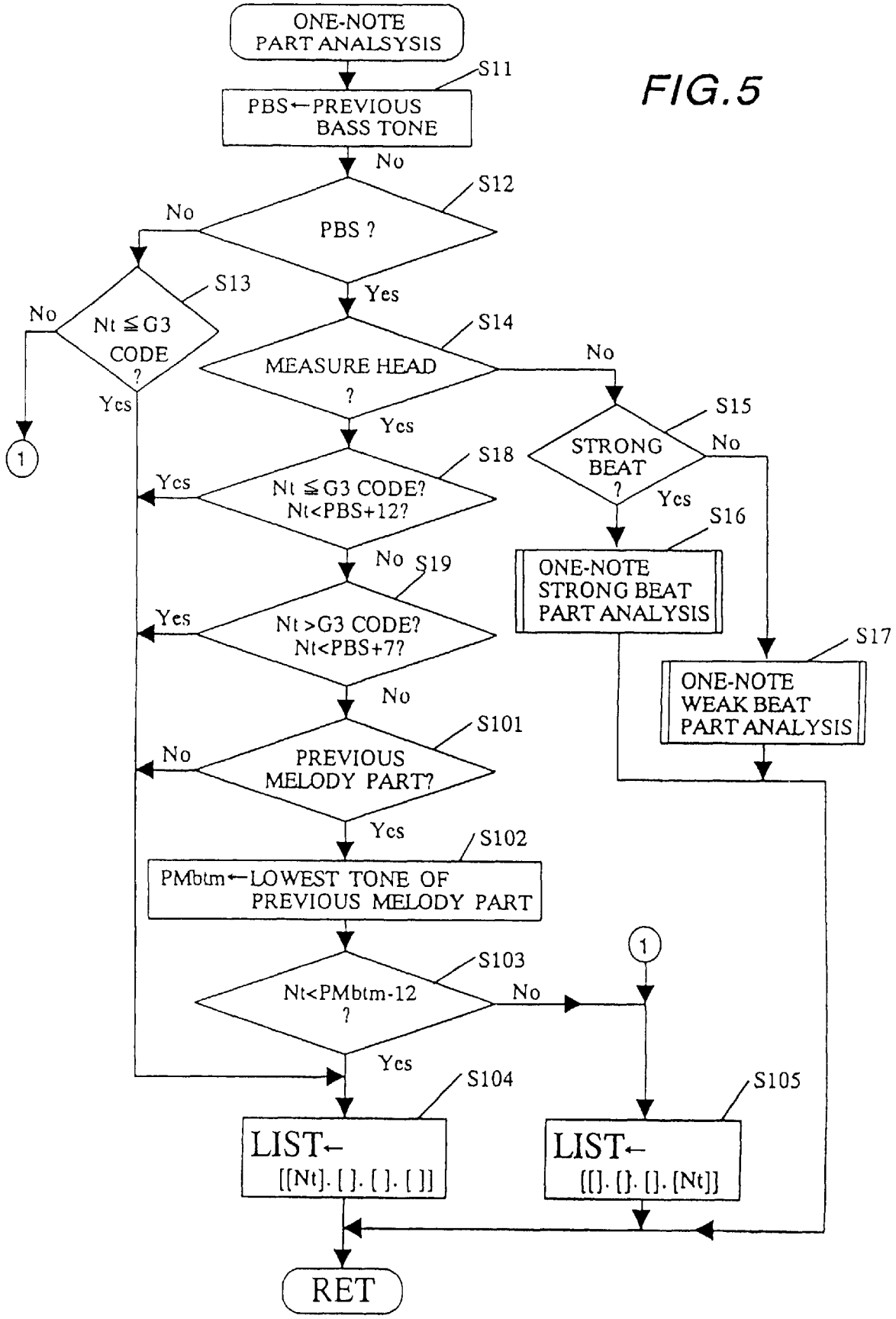
FIG. 5 is a flow chart of a one-note part analysis routine of the program.

In the one-note part analysis routine shown in FIG. 5, the CPU 1 sets at step S11 a key code or the previous bass tone (a key code or the bass part of the current whole analysis list LIST) as the detection tone PBS of the bass part. In addition, if the program is in an initial condition or the bass tone is not yet detected, the CPU 1 sets an invalid data as the detection tone PBS of the bass part to eliminate a previous bass tone. When the program proceeds to step S12, the CPU 1 determines whether the detection tone PBS of the previous bass tone is present or not. If the answer at step S12 is "No", the program proceeds to step S13 where the CPU 1 determines whether or not the input tone Nt is equal to or less than a G3 code (a key code). That is to say, the CPU 1 determines whether the input tone Nt is equal to or less than G3-note (196.00 Hz). If the answer at step S13 is "Yes", the program proceeds to step S104. If the answer at step S13 is "No", the program proceeds to step S105.

If the answer at step S12 is "Yes, the program proceeds to step S14 where the CPU 1 determines whether a current timing of the input tone is a measure head or not. If the answer at step S14 is "Yes", the CPU 1 causes the program to proceed to step S18 for processing at the following step. If the answer at step S14 is "No", the program proceeds to step S15 where the CPU 1 determines whether the current timing is a strong beat or not. If the current timing is a strong beat, the CPU 1 determines a "Yes" answer at step S15 and executes a one-note strong beat part analysis routine shown in FIG. 6. If the answer at step S15 is "No", the program proceeds to step S17 where the CPU 1 executes a one-note weak beat part analysis routine shown in FIG. 7. When the program proceeds at step S18 after determination of a "Yes"answer at step S14, the CPU 1 determines whether or not the input tone Nt is equal to or less than the G3 code and less than the detection tone PBS+12. If the answer at step S18 is "Yes", the program proceeds to step S104. If the answer at step S18 is "No", the program proceeds to step S19 where the CPU 1 determines whether or not the input tone Nt is more than the G3 code and less than the detection tone PBS +7. If the answer at step S19 is "Yes", the program proceeds to step S104. If the answer at step S19 is "No", the program proceeds to step S101 where the CPU 1 determines whether or not a detection tone is present in the previous melody part.

If the answer at step S101 is "No", the program proceeds to step S104. If the answer at step S101 is "Yes", the program proceeds to step S102 where the CPU 1 sets the lowest detection tone PMbtm of the previous melody part and causes the program to proceed to step S103. At step S103, the CPU 1 determines whether or not the input tone Nt is less than the lowest tone PMbtm −12 of the previous melody part. If the answer at step S103 is "Yes", the program proceeds to step S104, and if the answer at step S103 is "No", the program proceeds to step S105. At step S104, the CPU 1 executes processing for setting the element of the bass part on the whole analysis list as the input tone Nt and eliminating the other parts of the list. At step S105, the CPU 1 executes processing for setting the element or the melody part on the whole analysis list as the input tone Nt and eliminating the other parts of the list. After processing at step S104 or S105, the program returns to the main routine.

Figure 15:
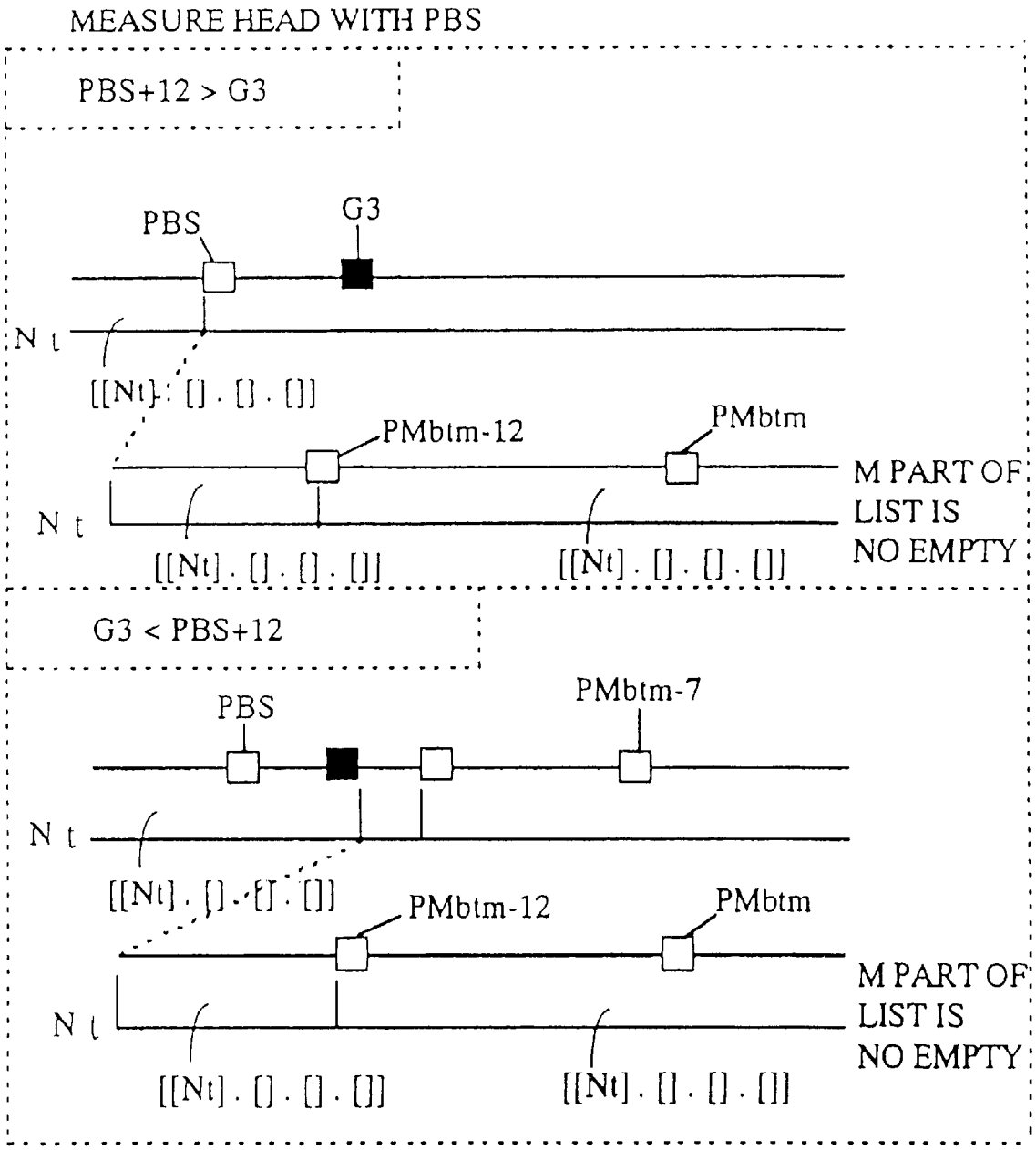
FIG. 15 is a view showing allotment of an input tone to performance parts in analysis of the one-note part.

As is understood from the above description, in case there is not any previous bass tone in the one-note-part analysis, the input tone Nt is assigned to the the bass part or melody part on a basis or the G3 code. In case there is a previous bass tone in the one-note-part analysis, the analysis of the one-note-part is effected in accordance with a current timing of the input tone Nt. When the current timing is a measure head, the one-note-part is analyzed in accordance with the G3 code and the detection tone PBS of the previous bass part or the lowest detection tone PMbtm of the previous melody part for assignment to the bass part or the melody part as shown in FIG. 15. When the current timing is different from the measure head, the one-note-part is analyzed in accordance with the current timing (a strong beat or a weak beat).

Figure 6:
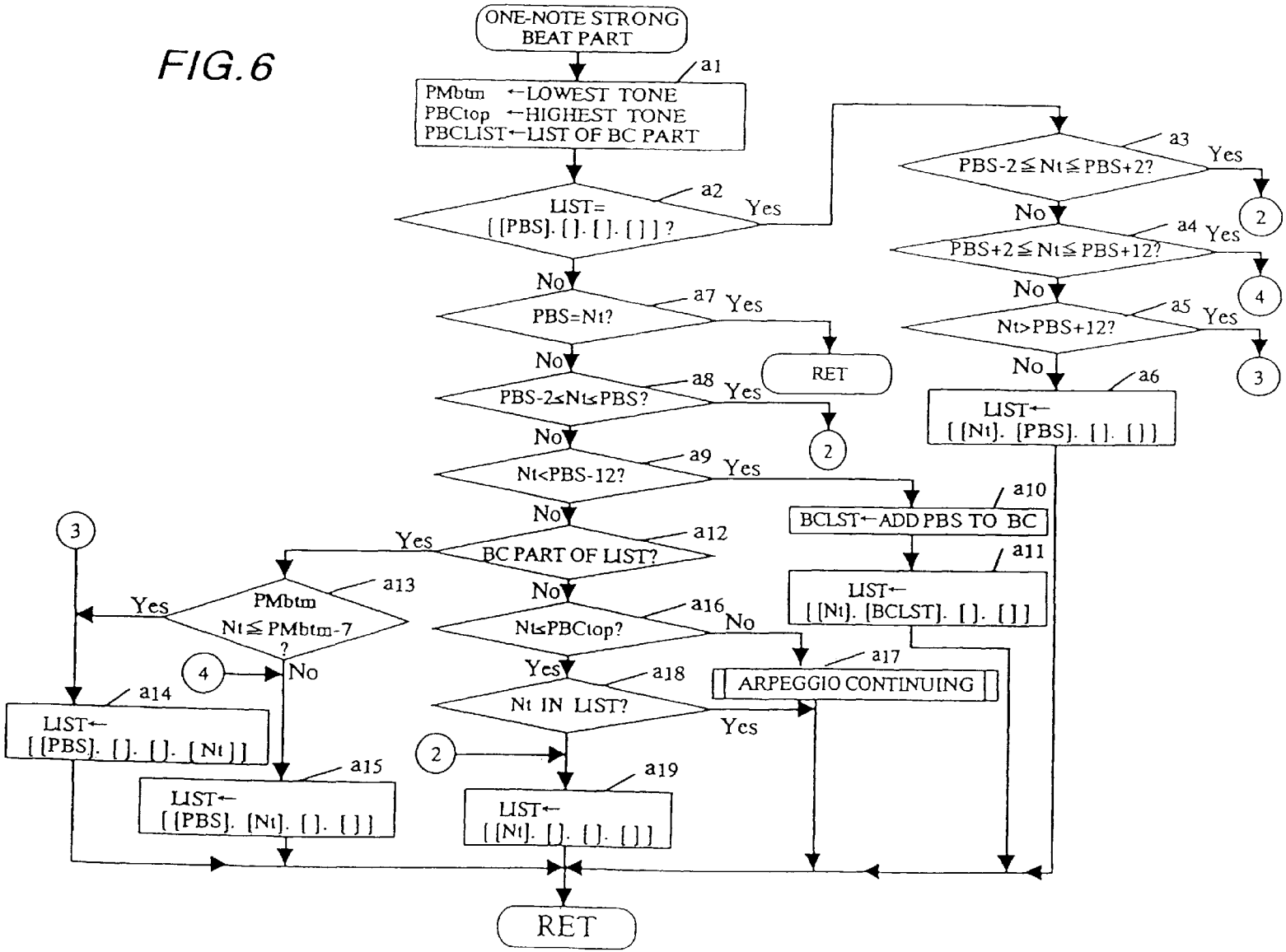
FIG. 6 is a flow chart of a one-note strong beat analysis routine of the program.

In processing or the one-note strong beat part analysis routine shown in FIG. 6, the CPU 1 sets at step a1 the lowest detection tone PMbtm or the previous melody part, the highest detection tone PBCtop of the previous bass chord part and the list PBCLIST of the previous bass chord part and causes the program to proceed to step a2. At step a2, the CPU 1 determines whether LIST=[[PBS]. []. []. []] is satisfied or not or whether the detected key code (an element of LIST) represents only the detection tone of the previous bass part or not. If the answer at step a2 is "Yes", the CPU 1 executes processing at the following step a3 to a6. If the answer at step a2 is "No", the CPU 1 executes processing at the followig step a7 to a9.

Figure 16:
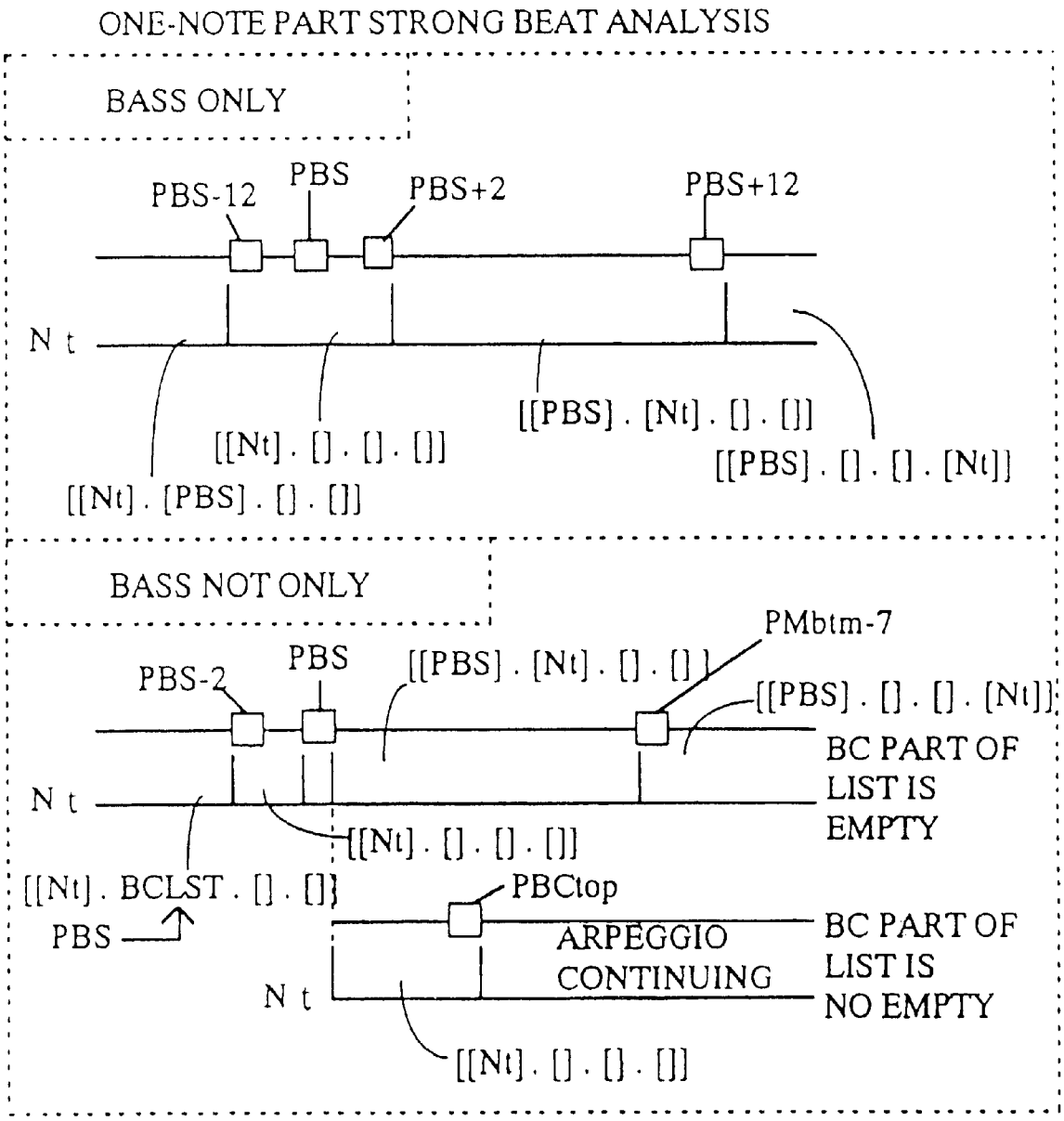
FIG. 16 is a view showing allotment of an input tone to performance parts in analysis of the one-note strong beat part.

Illustrated in FIG. 16 is allotment of the input tone Nt in the analysis of the one-note strong beat part. At step a3, a4, a5 of the one-note strong beat part analysis routine, the CPU 1 determines an interval relationship between the current input tone Nt and the detection tone PBS of the previous bass part. If "PBS-2≦Nt≦PBS+2" is satisfied at step a3, the program proceeds to step a19 where the CPU 1 sets the input tone Nt as an element of the bass part and makes the list of the bass chord part, melody code part and melody part empty. If "PBS+2≦Nt≦PBS+12" is satisfied at step a4, the program proceeds to step a15 where the CPU 1 sets the detection tone PBS as an element of the bass part, sets the input tone Nt as an element of the bass chord part and makes the list of the melody chord part and melody part empty. If "Nt>PBS+12" is satisfied at step a5, the program proceeds to step a14 where the CPU 1 sets the detection tone PBS as an element of the bass part, sets the input tone Nt as an element of the melody part and makes the list of the bass chord part and melody chord part empty. If "Nt>PBS+12" is not satisfied at step a5, the program proceeds to step a6 where the CPU 1 sets the input tone Nt as an element of the bass part, sets the detection tone PBS as an element of the bass chord part and makes the list of the melody chord part and melody part empty.

If in processing at step a2 the currently detected tone listed on the whole analysis list includes the detection tone PBS of the previous bass part and other tones, the CPU 1 determines an interval relationship between the current input tone Nt and the detection tone PBS of the previous bass part tone at step a7, a8 and a9. If "PBS =Nt" is satisfied at step a7, the program returns to the main routine. If "PB31

2≦Nt−PBS" is satisfied at step a8, the program proceeds to step a19 where the CPU 1 sets the input tone Nt as an element of the bass part and makes the list of bass chord part, melody chord part and melody part empty. If "Nt<PBS−12" is satisfied at step a9, the program proceeds to step a10 where the CPU 1 sets the detection (one PBS as the list BCLST of the previous bass chord part and causes the program 10 proceed to step a11. At step a11, the CPU 1 sets the input tone Nt as an element of the bass part, sets the list BCLST as an element of the bass chord part and make the list of the melody chord part and melody part empty. If "Nt<IBS−12" is not satisfied at step a9, the CPU 1 executes processing at the following step a12 to a18.

At step a12, the CPU 1 determines whether the bass chord part of LIST is empty or not. If the answer at step a12 is "Yes", the CPU 1 determines at step a13 whether the lowest detection tone PMbtm is present or not and whether "Nt≦PMbtm−7" is satisfied or not. If the answer at step a13 is "Yes", the program proceeds to step a14 where the CPU 1 sets the detection tone PBS as an element of the bass part, sets the input tone Nt as an element of melody part and makes the list of bass chord part and melody part empty. If the answer at step a12 is "No", the CPU 1 determines at step a16 whether "Nt≦PBCtop" is satisfied or not. If the answer at step a16 is "No", the program proceeds to step a17 where the CPU 1 executes an arpeggio continuing routine shown in FIG. 8. If the answer at step a16 is "Yes", the program proceeds to step a18 where the CPU 1 determines whether or not the input tone Nt is included in the bass chord part of the whole analysis list LIST. If the answer at step a18 is "Yes", the program returns to the main routine. If the answer at step a18 is "No", the program proceeds to step a19 where the CPU 1 sets the input tone Nt as an element of the bass part, makes the list of the bass chord part, melody chord part, melody chord part empty and returns the program to the main routine.

Figure 7:
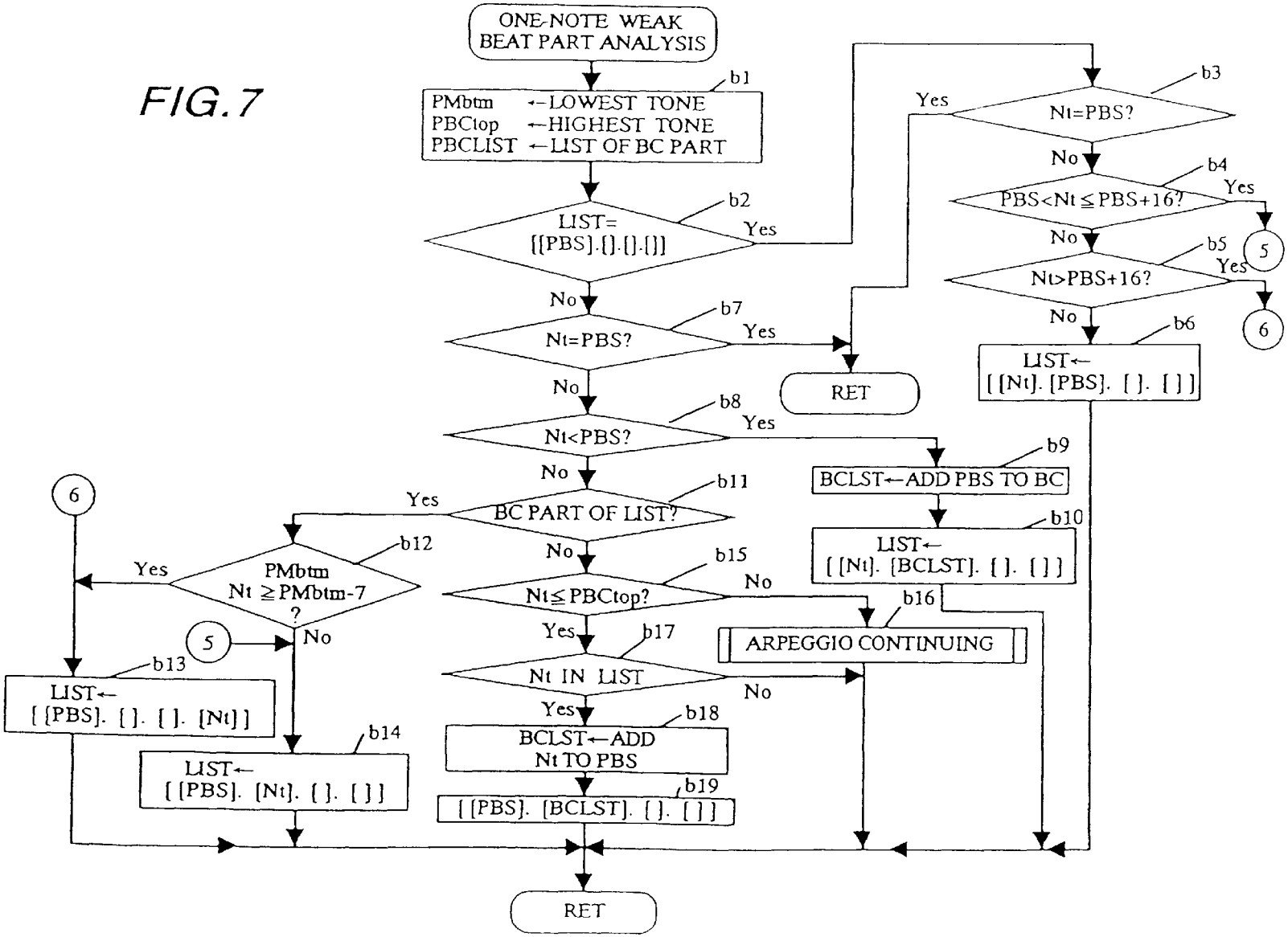
FIG. 7 is a flow chart of a one-note weak beat analysis routine of the program.

In processing of the one-note weak beat part analysis shown in FIG. 7, the CPU 1 sets at step b1 a key code of the lowest tone of the previous melody part as PMbtm, a key code of the highest tone of the previous bass chord part as PBCtop and the list of the previous bass chord part as PBCLIST and causes the program to proceed to step b2. At step b2, the CPU 1 determines whether or not the presently detected key code includes only the detection tone PBS of the previous bass part. If the answer at step b2 is "Yes", the CPU 1 executes processing at the following step b3 to b6. If the answer at step b2 is "No", the CPU 1 executes processing at the following step b7 to b11.

Figure 17:
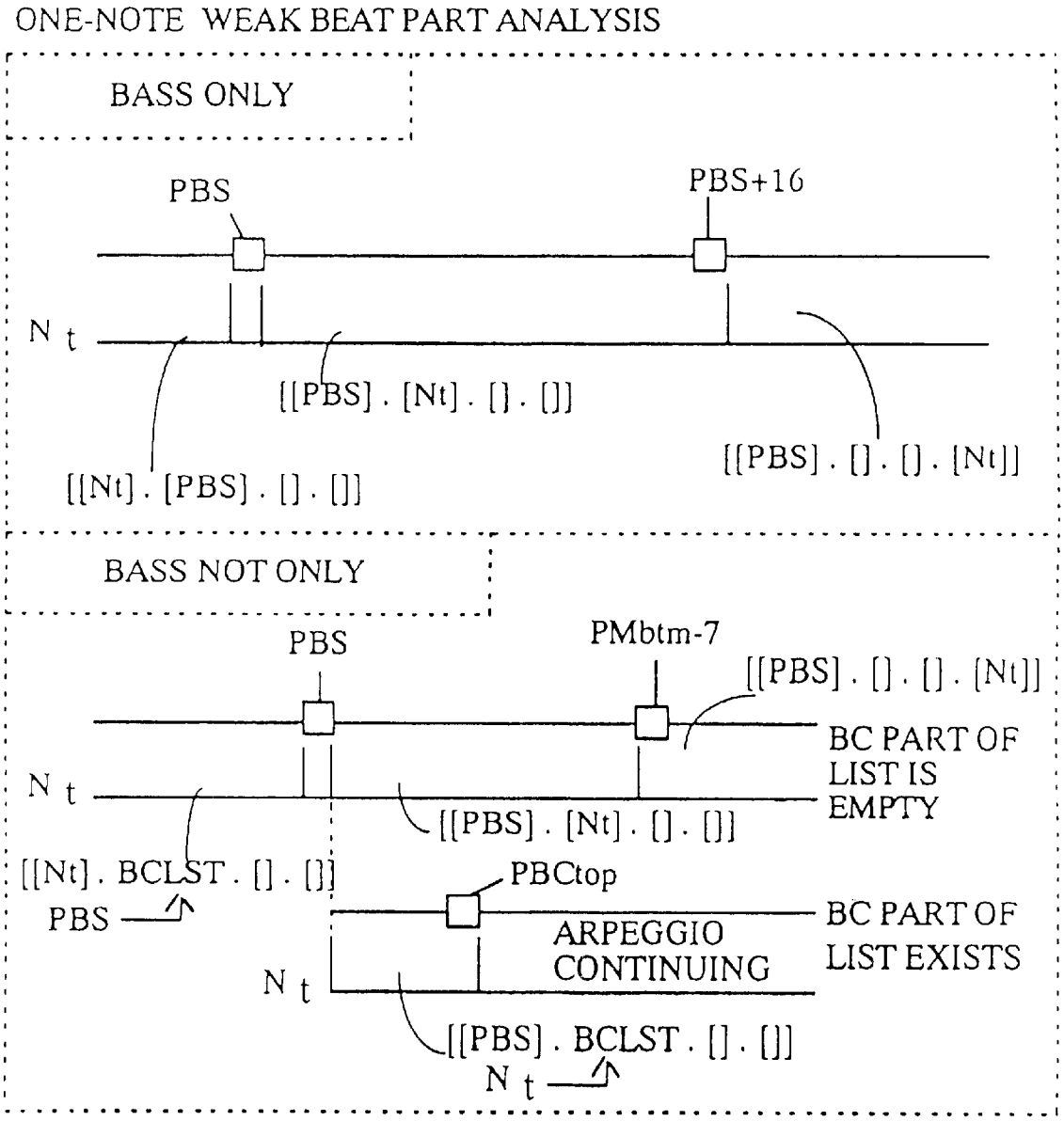
FIG. 17 is a view showing allotment of an input tone to performance parts in analysis of the one-note weak beat part.

Illustrated in FIG. 17 is allotment of the parts effected in accordance with the input tone Nt during processing of the one-note weak beat part analysis routine. At step b3, b4 and b5 of the weak beat one-note-part analysis routine, the CPU 1 determines an interval relationship between the input tone Nt and the detection tone PBS of the previous bass part, renews the whole analysis list LIST in accordance with the tone pitch of the input tone Nt and returns the program to the main routine. If "Nt=PBS" is satisfied at step b3, the program returns to the main routine. If "PBS<Nt≦PBS+16" is satisfied at step b4, the program proceeds to step b14 where the CPU 1 sets the detection tone PBS as an element of the bass part, sets the input tone Nt as an element of the bass chord part and makes the list of the melody chord part and melody part empty. If "Nt>PBS+16" is satisfied at step b5, the program proceeds to step b13 where the CPU 1 sets the detection tone PBS as an element of the bass part, sets the input tone Nt as an element of the melody part and makes the list of the bass chord part and melody code part empty. If the input tone Nt is less than the detection tone PBS, the program proceeds to step b6 where the CPU 1 sets the input tone Nt as an element of the bass part, sets the detection tone PBS as an element or the bass chord part and makes the list or the melody chord part and melody part empty.

In case the presently detected tone includes the detection tone PBS of the previous bass part and other tones at step b2, the CPU 1 determines an interval relationship between the input tone Nt and the detection tone PBS of the previous bass part at step b7 and b8, renews the whole analysis list LIST in accordance with the tone pitch of the input tone Nt and returns the program to the main routine. If "Nt=PBS" is satisfied at step b7, the program returns to the main routine. If "Nt<PBS" is satisfied at step b8, the program proceeds to step b9 where the CPU 1 adds the detection tone PBS to the previous bass chord part and sets it as BCLST. At the following step b10, the CPU 1 sets the input tone Nt as an element of the bass part, sets BCLST as an element or the bass chord part and makes the melody chord part and melody part empty. If the input tone Nt is higher than the detection tone PBS, the CPU 1 executes processing at the following step b11 to b19.

At step b11, the CPU 1 determines whether the bass chord part of the whole analysis list LIST is empty or not. If the answer at step b11 is "Yes", the program proceeds to step b12 where the CPU 1 determines whether the lowest detection tone PMbtm of the previous melody part is present or not and whether "Nt≦PMbtm−7" is satisfied or not, renews the whole analysis list LIST in accordance with the tone pitch of the input tone Nt and returns the program to the main routine. If the answer at step b12 is "Yes", the program proceeds to step b13 where the CPU 1'sets the detection tone PBS as an element of the bass part, sets the input tone Nt as an element of the melody part and makes the list of the bass chord part and melody code part empty. If the answer at step b12 is "No", the program proceeds to step b14 where the CPU 1 sets the detection tone PBS as an element of the bass part, sets the input tone Nt as an element of the bass chord part and makes the list of the melody chord part and melody par empty.

If at step b11 the bass chord part of the whole analysis list LIST exists, the program proceeds to step b15 where the CPU 1 determines whether "Nt≦PBCtop" is satisfied or not. If the answer at step b15 is "No", the program proceeds to step b16 where the CPU 1 executes the arpeggio continuing routine shown in FIG. 8. If the answer at step b15 is "Yes", the program proceeds to step b17 where the CPU 1 determines whether the bass chord part of the whole analysis list LIST includes the input tone Nt or not. If the answer at step b17 is "No", the program returns to the main routine. If the answer at step b17 is "Yes", the program proceeds to step b18 where the CPU 1 adds the input tone Nt to the list of the previous bass chord part and sets it as BCLST. At the following step b19, the CPU 1 sets the detection tone PBS as an element of the bass part, sets BCLST as the list of the bass chord part and makes the list of the melody chord part and melody part empty. Thereafter, the program returns to the main routine.

In processing of the one-note strong beat part analysis and the one-note weak beat part analysis, the condition or tone area for allotment of the input tone Nt will differ. In the case that only the bass part has been previously detected, the input tone Nt is set as the bass part in processing of the weak beat only when it is lower than the detection tone PBS as shown in FIG. 17, while the input tone Nt is set as the bass part in processing of the strong beat until it becomes PBS+2. In the case that the bass chord part of the whole analysis list LIST exists, the input tone Nt is added to the bass chord part in processing of the weak beat when "PBS<Nt<PBCtop" is satisfied, while the input tone Nt is set as the bass part in processing of the strong beat. Thus, when the input tone Nt is near the detection tone PBS or the previous bass part, the input tone Nt is set as the bass part in the strong beat higher than that in the weak beat so that the musical tune tends to be a bass in the strong beat and to be a bass chord in the weak beat.

Figure 8:
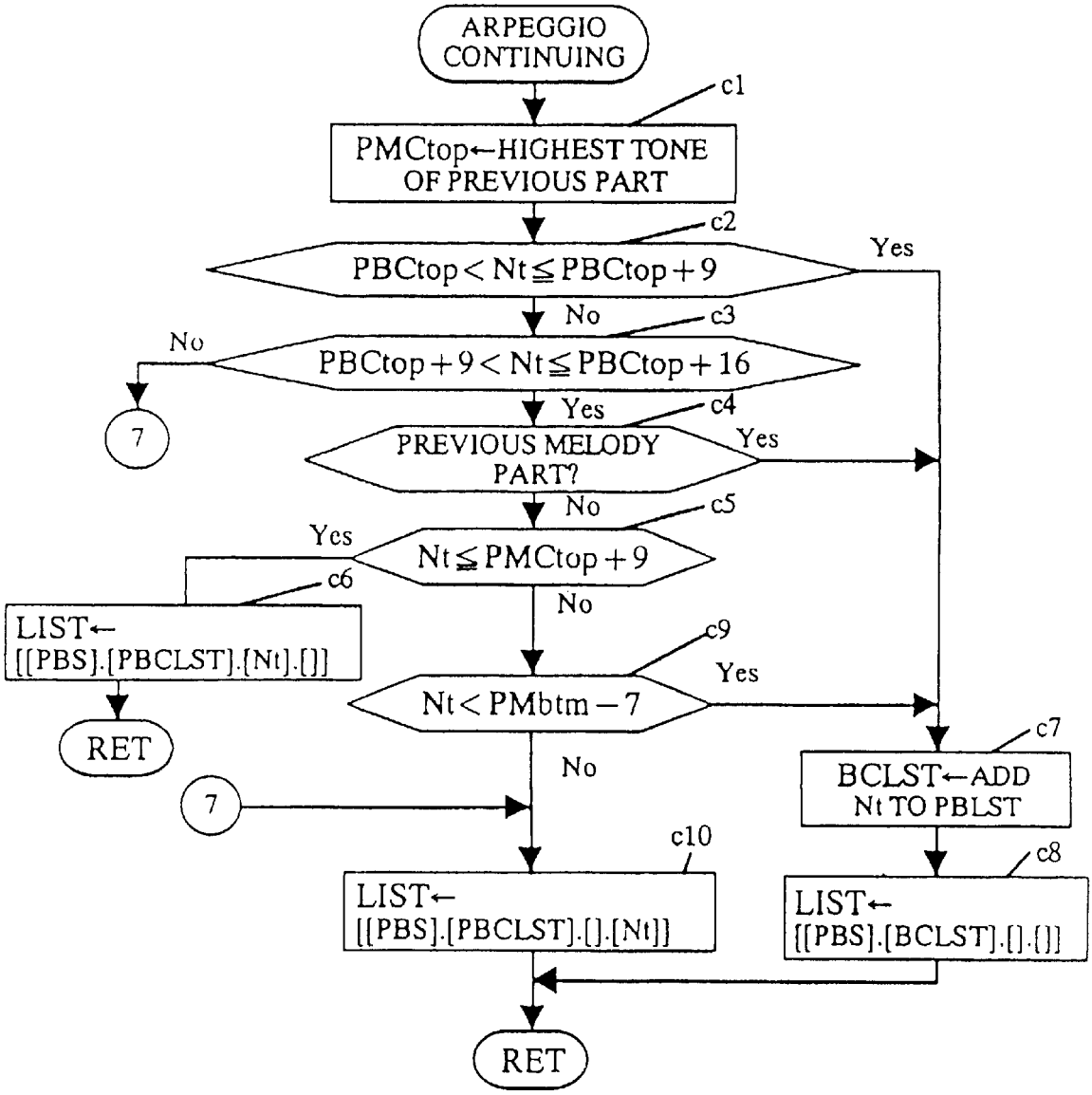
FIG. 8 is a flow chart of an arpeggio continuing routine of the program.

When the input tone Nt is higher than the highest tone PBCtop of the previous bass chord, the arpeggio continuing routine of FIG. 8 will be executed as follows. At step c1, the CPU 1 sets a key code of the highest tone of the previous melody chord part as PMCtop. Subsequently, the CPU 1 determines an interval relationship between the input tone Nt and the highest tone PBCtop of the previous bass chord part at step c2 and c3, renews the whole analysis list LIST in accordance with the tone pitch of the input tone Nt and returns the program to the main routine.

Figure 18:
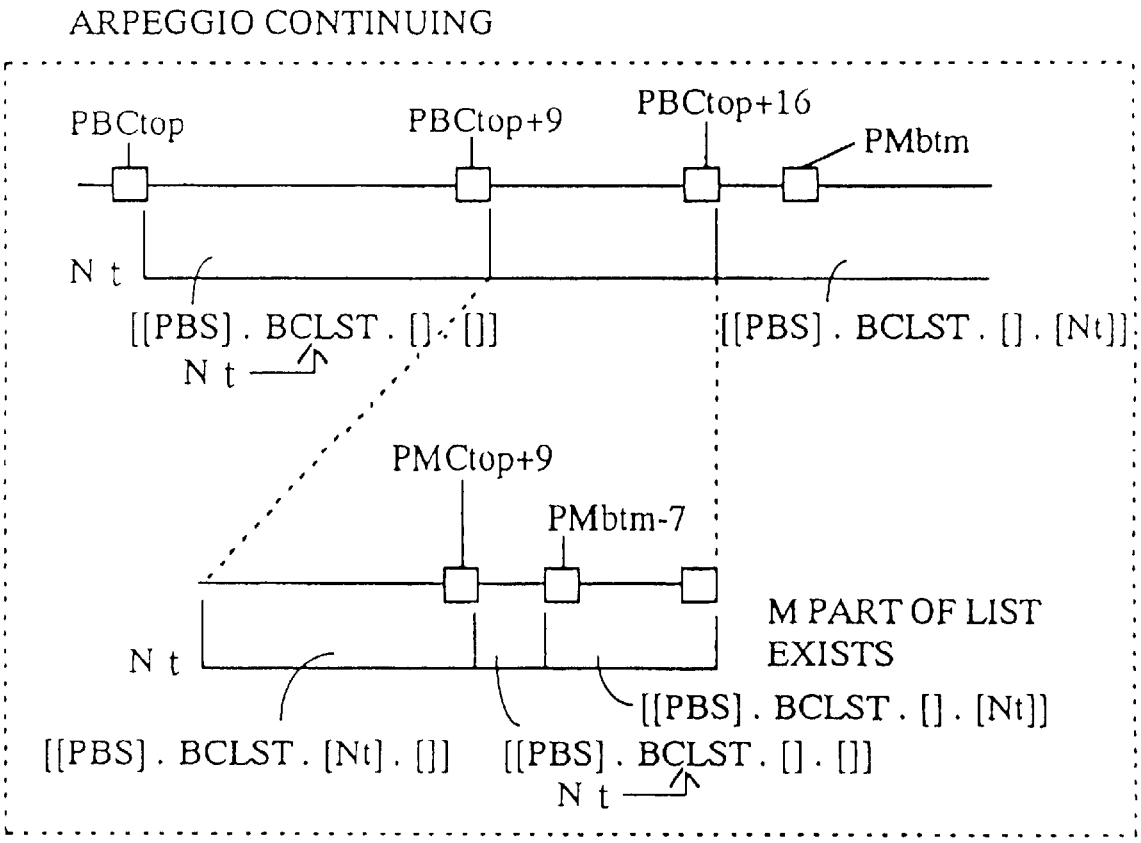
FIG. 18 is a view showing allotment of an input tone to performance parts in the arpeggio continuing.

Illustrated in FIG. 18 is allotment of the parts based on the input tone Nt during processing of the arpeggio continuing routine. If "PBCtop<Nt≦PBCtop+9" is satisfied at step c2, the program proceeds to step c7 where the CPU 1 adds the input tone Nt to the list PBCLST of the previous bass chord part and sets it as BCLST. At the following step c8, the CPU 1 sets the detection tone PBS as an element of the bass part, sets BCLST as an element of the bass chord part and makes the list of the melody chord part and melody part empty. If "PBCtop+9<Nt≦PBCtop +16" is not satisfied at step c3, the program proceeds to step d10 where the CPU 1 sets the detection tone PBS as an element of the bass part, sets the list PBCLST of the previous bass chord part as an element of bass chord part, sets the input tone Nt as an element of the melody part and makes the list of the melody chord part empty. If "PBCtop+9<Nt≦PBCtop+16" is satisfied at step c3, the program proceeds to step c4 where the CPU 1 determines whether the list of the previous melody part is empty or not. If the answer at step c4 is "Yes", the CPU 1 executes processing at step c7. If the answer at step c4 is "No", the CPU 1 determines at step c5 whether "Nt≦PMCtop+9" is satisfied or not. If the answer at step c5 is "Yes", the program proceeds to step c6 where the CPU 1 sets the detection tone PBS as an element of the bass part, sets the list PBCLST of the previous bass chord part as the an element of the bass chord, sets th input tone Nt as an element of the melody chord part and makes the 11st of the melody part empty. Thereafter, the program returns to the main routine. If "Nt≦PMCtop+9" is not satisfied at step c5, the program proceeds to step c9 where the CPU 1 determines whether "Nt<PMbtm−7" is satisfied or not. If the answer at step c9 is "Yes", the CPU 1 executes processing at the following step c7 and c8. If the answer at step c9 is "No", the CPU 1 executes processing at step c10.

In processing of the arpeggio continuting routine, as shown in FIG. 18, the key code higher than the highest tone PBCtop of the previous bass chord part is assigned to the bass chord part, melody chord part or melody part in accordance with the interval relationship among PBCtop+9, PMCtop+9 and PMbtm−7.

Figure 9:
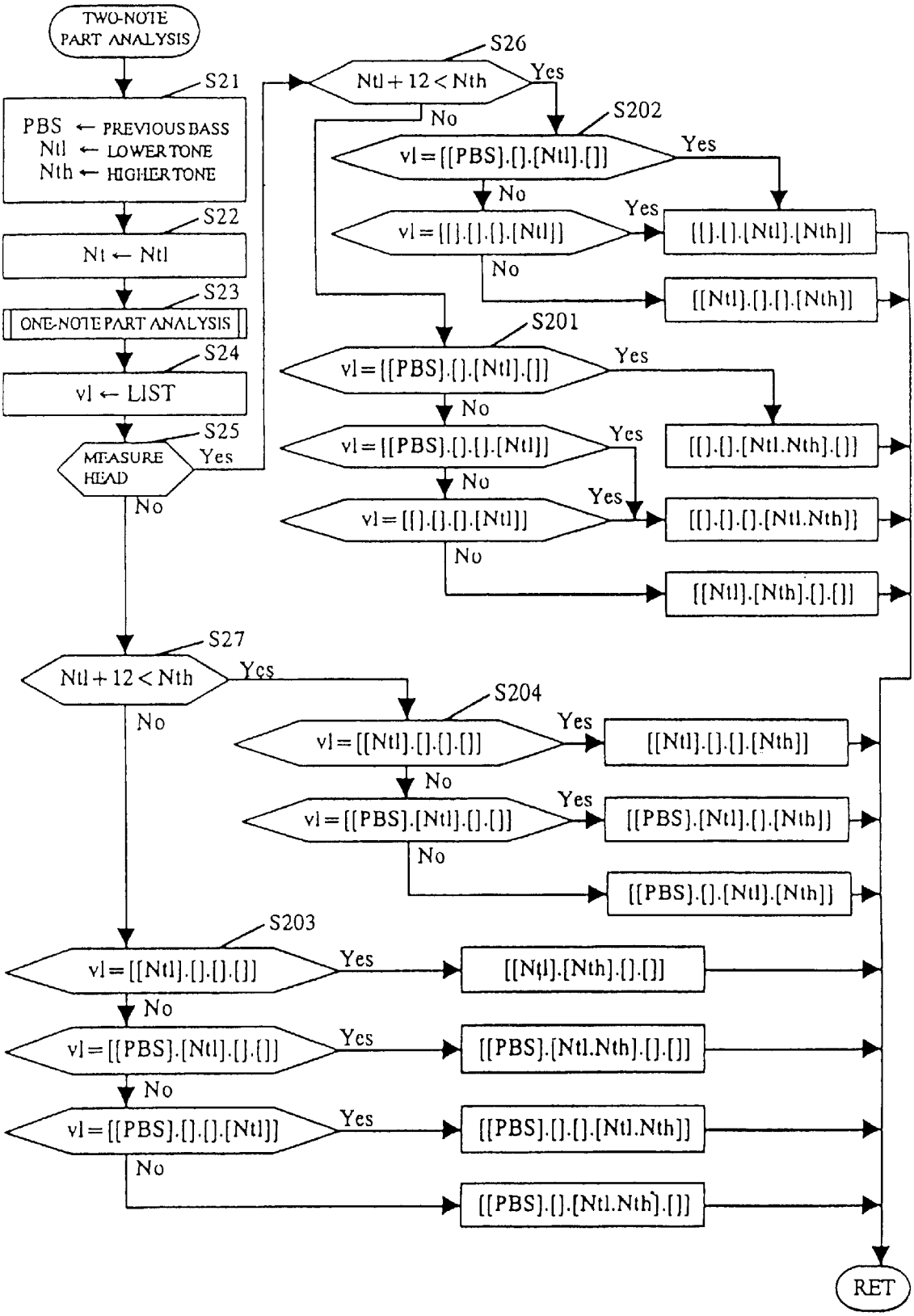
FIG. 9 is a flow chart of a two-note part analysis routine of the program.
Figure 11:
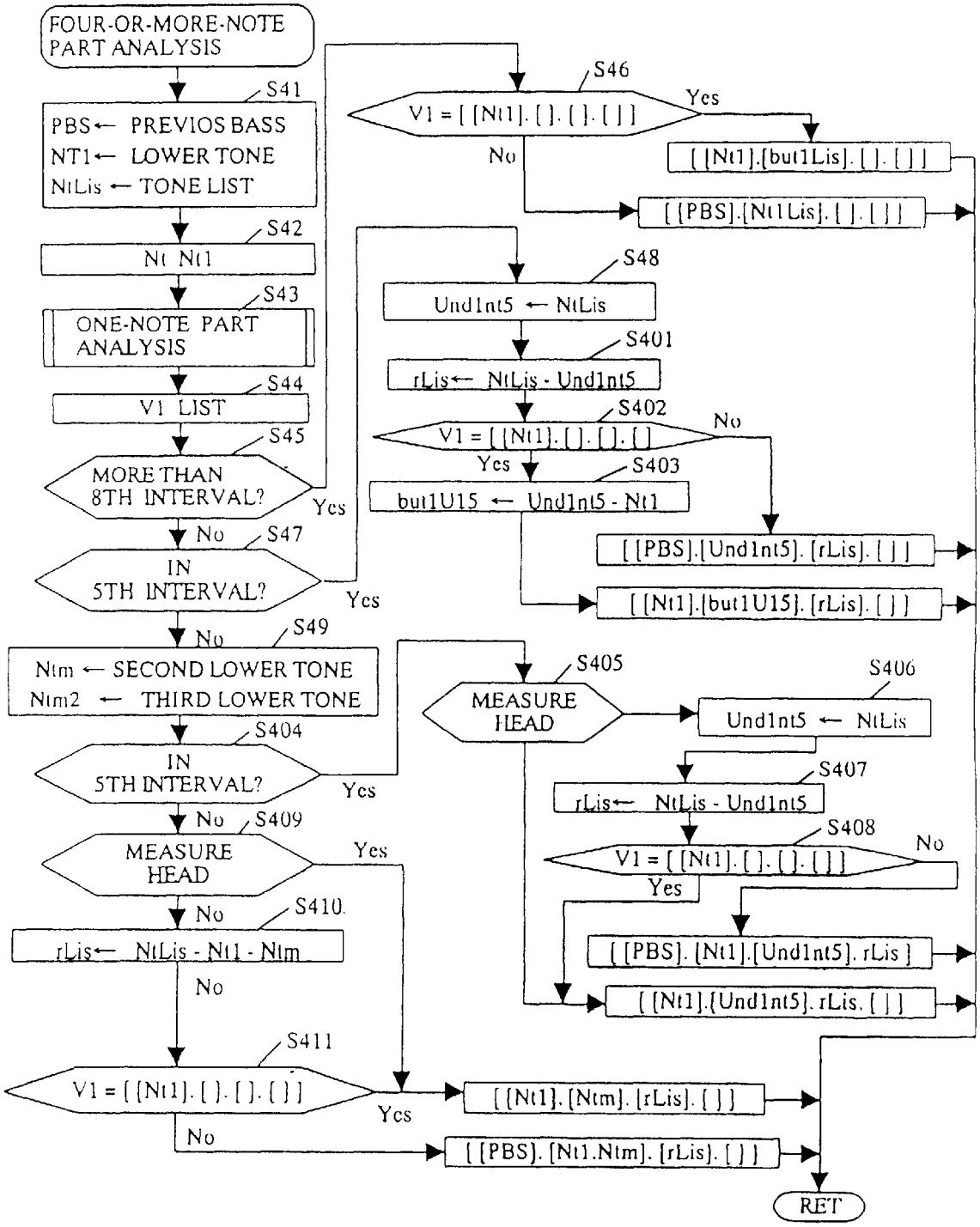
FIG. 11 is a flow chart of a four-or-more-note part analysis routine of the program.

The foregoing one-note strong beat part analysis, the one-note weak beat part analysis and the one-note part analysis including each processing of the arpeggio continuing are conducted in common for two-note part analysis, three-note part analysis and [our-or-more-note part analysis. In each processing of the two-note part analysis, three-note-part analysis and four-or-more-note part analysis described below, one-tone part analysis for the lowest tone of plural input tones is first performed. In addition, each processing of the two-note part analysis, three-note part analysis and four-or-more-note part analysis shown in FIGS. 9 to 11 is effected to determine whether the input tone is a measure head or not and to renew the whole analysis list in accordance with an interval relationship among depressed key tones and the content of the whole analysis list defined by a result or the one-note part analysis. In the flow charts shown in FIGS. 9 to 11, a hexagonal determination block "v1=[. . . ]" represents whether the left list "v1" is identical with an element of the right list or not. The content of a rectangular block represents renwal of the whole analysis list thereto. (LIST −[. . . ])

In processing of the two-note part analysis shown in FIG. 9, the CPU 1 sets at step S21 a key code of the previous bass tone as PBS, a key code of the lower tone of depressed key two-tones (input tone) as Nt1, a key code of the higher tone of depressed key two-tones Nth and causes the program to proceed to step S22. Subsequently, the CPU 1 sets the lower tone Nt1 as Nt at step S22 and executes the foregoing one-note part analysis at step S23. At the following step S24, the CPU 1 sets the whole analysis list LIST indicative of a result of the one-note part analysis as "v1" and causes the program to proceed to step S25. At step 25, the CPU 1 determines whether the current timing is a measure head or not. If the answer at step S25 is "Yes", the program proceeds to step S26 where the CPU 1 determines whether an interval difference between "Nt1" and "Nth" exceeds one octave or not. If the answer at step S25 is "No", the program proceeds to step S27 where the CPU 1 determines whether "Nt1+12" exceeds "Nth" or not. Thus, the CPU1 assigns "Nt1", "Nth" to the respective parts in accordance with the list "V1" as shown in the flow chart for renewal of the whole analysis list LIST.

When the interval difference of "Nt1" and "Nth" at the measure head is in one octave, the CPU 1 assigns "Nt1" and "Nth" as a pair to the melody chord part and the melody part and assigns "Nt1" to the bass part and "Nth" to the bass chord part by processing at the following step after step S201. When the interval difference of "Nth1" and "Nth" at the measure head exceeds one octave, the CPU 1 assignes "Nt1" to the melody chord part and "Nth" to the melody part and assigns "Nt1" to the bass part and "Nth" to the melody part by processing at the following step after step S202. When the interval difference of "Nt1" and "Nth" is in one octave, the CPU 1 executes processing at step S203 and its following step to assign "Nt1" to the bass part and "Nth" to the bass chord part in a condition where the bass part is "Nt1" and the other parts are empty, to assing PBS to the bass part in a condition where the bass part is not "Nt1" or the other parts are not empty and to assign "Nt1", "Nth" as a pair to the bass chord part, the melody chord part or the melody part. When the interval difference of "Nt1" and "Nth" exceeds one octave, the CPU 1 executes processing at step S204 and it following step to assign "Nt1" to the bass part and "Nth" to the melody part in a condition where the bass part is "Nt1" and the other parts are empty, to assign PBS to the bass part and "Nth" to the melody part in a condition where the bass part is not "Nt1" or the other parts are not empty and to assign "Nt1" to the bass chord part or the melody chord part.

In processing of the three-note part analysis shown in FIG. 10, the CPU 1 sets at step S31 the key code of the previous bass tone as PBS, the key code of the lower tone of three tones of depressed keys (input tone) as "Nt1", the key code of the intermediate tone as "Ntm" and the key code of the higher tone of the three tones as "Nth". Subsequently, the CPU 1 sets at step S32 the lower tone "Nt1" as "Nt", executes at step S33 the one-note part analysis and sets at step S34 the whole analysis list LIST indicative of a result of the one-note part analysis as "v1". When the program proceeds to step S35, the CPU 1 determines whether the current performance part is a measure head or not. If the answer at step S35 is "Yes", the program proceeds to step S36 where the CPU 1 determines whether or not the higher tone and lower tone at the measure head are in an 5th interval apart from the intermediate tone. If the answer at step S36 is "Yes", the program proceeds to the following step where the CPU 1 determines whether or not "v1=[[Nt1]. []. []. []]" is satisfied. If the answer is "Yes", the CPU 1 assigns "Nt1"to the bass part and "Ntm". "Nth" to the bass chord part. If the answer is "No", the CPU 1 assings the three tones of "Nt1". "Ntm" and "Nth" to the bass chord part.

In the answer at step S35 is "No", the program proceeds to step S37 where the CPU 1 determines whether or not the higher tone and lower tone are in the 5th interval apart from the intermediate tone. If the answer at step S37 is "Yes, the CPU 1 determines at the following step whether or not "v1=[[Nt1]. []. []. []]" is satisfied. If the answer is "Yes", the CPU assigns "Nt1" to the bass part and "Ntm". "Nth" to the bass chord part. If the answer is "No", the CPU 1 assigns PBS to the bass part and the three tones of "Nt1". "Ntm", "Nth" to the bass chord part. Since the chord at the measure head is changeable as described above, the CPU 1 does not assign PBS to the bass part. Since the chord under no presence of the measure head is continued, the CPU 1 assings PBS to the bass part.

As is understood from the flow chart, when the higher tone and lower tone at the measure head is out of the 5th interval apart from the intermediate tone, the three tones of "Nt1", "Ntm", "Nth" are assigned to the lower tone side. When the higher tone and lower tone under no presence of the measure head is out of the 5th interval apart from the intermediate tone, the three tones of "Nt1", "Ntm", "Nth"are assinged to the higher tone side. Even if the higher tone and lower tone at the measure head is out of the 5th interval apart from the intermediate tone, the CPU 1 assigns "Nt1"to the bass part without assigning PBS to the bass part. In addition, "highest two notes more than an 8th interval apart"means the fact that an interval between "Ntm" and "Nth" is higher than the 8th interval, "lowest two notes less than an 8th interval" means the fact that an interval between "Nt1"and "Ntm" is in the 8th interval, and "highest two notes less than an 8th interval apart" means also the fact that an interval between "Ntm" and "Nth" is in the 8th interval. In the case of the 5th interval, these facts becomes similar to the above case.

In processing of the four-note-or-more part analysis shown in FIG. 11, the CPU 1 sets at step S41 the key code of the previous bass tone as PBS, the key code of the lowest tone of depressed key tones as "Nt1", the list of depressed key tones as "NtLis" and the list of tones of depressed keys except for the lowest tone as "but1Lis". Subsequently, the CPU 1 sets at step S42 the lowest tone Nt1 as "Nt", executes at step S43 the one-note part analysis, sets the whole analysis list. LIST indicative of a result of the one-note-part analysis as "v1" and causes the program to proceed to step S45. At step S45, the CPU 1 determines whether an interval difference between the lowest tone and the next lower tone (the second lower tone) is more than the 8th interval or not. If the answer at step S45 is "Yes", the program proceeds to step S46 where the CPU 1 determines whether "v1=[[Nt1]. []. []. []]" is satisfied or not. If the answer at step step S46 is "Yes", the CPU 1 assings "Nt1" to the bass part and the list "but1Lis" to the bass chord part. If the answer at step S46 is "No", the CPU 1 assigns PBS to the bass part and the depressed key list "NtLis" to the bass chord part. If the answer at step S45 is "No", the program proceeds to step S47 where the CPU 1 determines whether the interval difference of the second lower tone is in the 5th interval or not. If the answer at step S47 is "Yes", the CPU 1 executes processing at the following step after step S48. If the answer at step S47 is "No", the CPU 1 executes processing at the following step from step S49.

At step S48, the CPU 1 sets the list "NtLis" of tones of depressed keys as UndInt 5 and causes the program to proceed to step S401 where "NtLis-UndInt 5" is set as rLis. Subsequently, the CPU 1 determines at step S402 whether "v1=[[Nt1]. []. []. []]" is satisfied or not. If the answer at step S402 is "No", the CPU 1 assigns PBS to the bass part. UndInt 5 to the bass chord part and rLis to the melody chord pan. If the answer at step S402 is "Yes", the program proceeds to step S403 where the CPU 1 sets "UndInt 5-Nt1"as the list "but1U15" and assigns at the following step "Nt1" to the bass part. "but 1U15" to the bass chord part and "tLis" to the melody chord part.

Assuming that the program proceeds to step S49, the CPU 1 sets a key code of the second lower tone of the key depression list NtLis as "Ntm" and a key code or the third lower tone or NtLis as "Ntmn2" and causes the program to proceed to step S404. At step S404, the CPU 1 determines whether an interval between "Ntm" and "Ntm2" is in the 5th interval or not. If the answer at step S404 is "Yes", the program proceeds to step S405. If the answer at step S404 is "No", the program proceeds to step S409. Thus, the CPU 1 determines at step S405 or S409 whether the current timing is a measure head or not. Subsequently, the CPU 1 assings the tones of depressed keys to the respective parts in accordance with the interval between "Ntm" and "Ntm2" to renew the whole analysis 11st LIST.

When the interval between "Ntm" and "Ntm2" at the measure head is in the 5th interval, the CPU 1 assings "Nt1"to the bass part, "UndInt 5" to the bass chord part and "rLis"to the melody chord part. When the interval between "Ntm"and "Ntm2" is out or the measure head in the 5th interval, the CPU 1 sets at step S406 "NtLis" as "UndInt5" and at step S407 "NtLis-UndInt5" as "rLis" and causes the program to proceed to S408. At step S408, the CPU 1 determines whether "v1=[[Nt1]. []. []. []]" is satisfied or not. If the answer at step S408 is "No", the CPU 1 assings "PBS" to the bass part, "Nt1" to the bass chord part, "Undlnt5" to the melody chord part and "rLis" to the melody part. If the answer at step S408 is "Yes", the CPU 1 assings "Nt1" to the bass part, "UndInt5" to the bass chord part and "rLis" to the melody part.

When the interval between "Ntm" and "Ntm2" at the measure head is beyond the 5th interval, the CPU 1 assings "Nt1" to the bass part, "Ntm" to the bass chord part, the melody chord part and "rLis" to the melody chord part. When the interval between "Ntm" and "Ntm2" is out of the measure ahead and beyond the 5th interval, the CPU 1 sets at step S410 the list "NtLis-Nt1-Ntm" as the list "rLis" and determines at step S411 whether "v1=[[Nt1]. []. []. []]" is satisfied or not. If the answer at step S411 is "No", the CPU 1 assings "PBS" to the bass part, "Nt1", "Ntm" to the bass chord part and "rLis" to the melody chord part. If the answer at step S411 is "Yes", the CPU 1 assings "Nt1" to the bass part, "Ntm" to the bass chord part and "rLis" to the melody chord part.

With the foregoing processing of the performance parts, the key codes produced during the interruption processing every 8th-note duration are analyzed into four performance parts in accordance with plural conditions such as the tone pitch, the current timing, the strong beat or weak beat the interval relative to the previous bass part and the interval relative to the previous melody part to obtain each key code of the performance parts in the whole analysis list LIST. Thus, detection of a chord is effected on a basis of the whole analysis list as described below.

In processing of the chord detection routine shown in FIG. 12, the CPU 1 produces at step S51 a list of notes of the bass chord part [and melody chord part] with redundant existence of the same notes omitted and sets the produced list as "ShrLis" and determines at step S52 whether the elements of the list "ShrLis" are more than three (3) or not. If the answer at step S52 is "Yes", the CPU 1 executes processing or the chord detection at the following step S53 to S55. If the answer at step S52 is "No", the program proceeds to step S56. At step S53, the CPU 1 sets information CHRD of 12 bits for chord detection corresponding with the key codes in the list "ShrLis" as "1" and sets the other bits as "0". Thus, the CPU 1 scans the chord table based on the information CHRD to detect a chord. Subsequently, the CPU 1 determines at step S55 whether the chord detection has been successful or not. If the answer at step S55 is "Yes", the program returns to the main routine. If the chord detection has failed, the program proceeds to step S56 where the CPU 1 sets a list of notes of the bass part and bass chord part with redundant existence of the same notes omitted as the list "ShrLis". Al the following step S57, the CPU 1 determines whether or not the elements of the list "ShrLis" are more than three (3). If the answer at step S57 is "Yes", the CPU 1 executes processing at step S58, S59 to detect a chord in the same manner as the processing at step S53 and S54. Subsequently the program proceeds to step S501 where the CPU 1 determines whether the chord detection has been successful or not. If the answer at step S501 is "Yes", the program returns to the main routine. If the answer at step S501 is "No", the program proceeds to step S502 where the CPU 1 sets a list of notes of the bass part, bass chord part and melody chord part with redundant existence of the same notes omitted as the list "ShrLis" and returns the program to the main routine.

Figure 13:
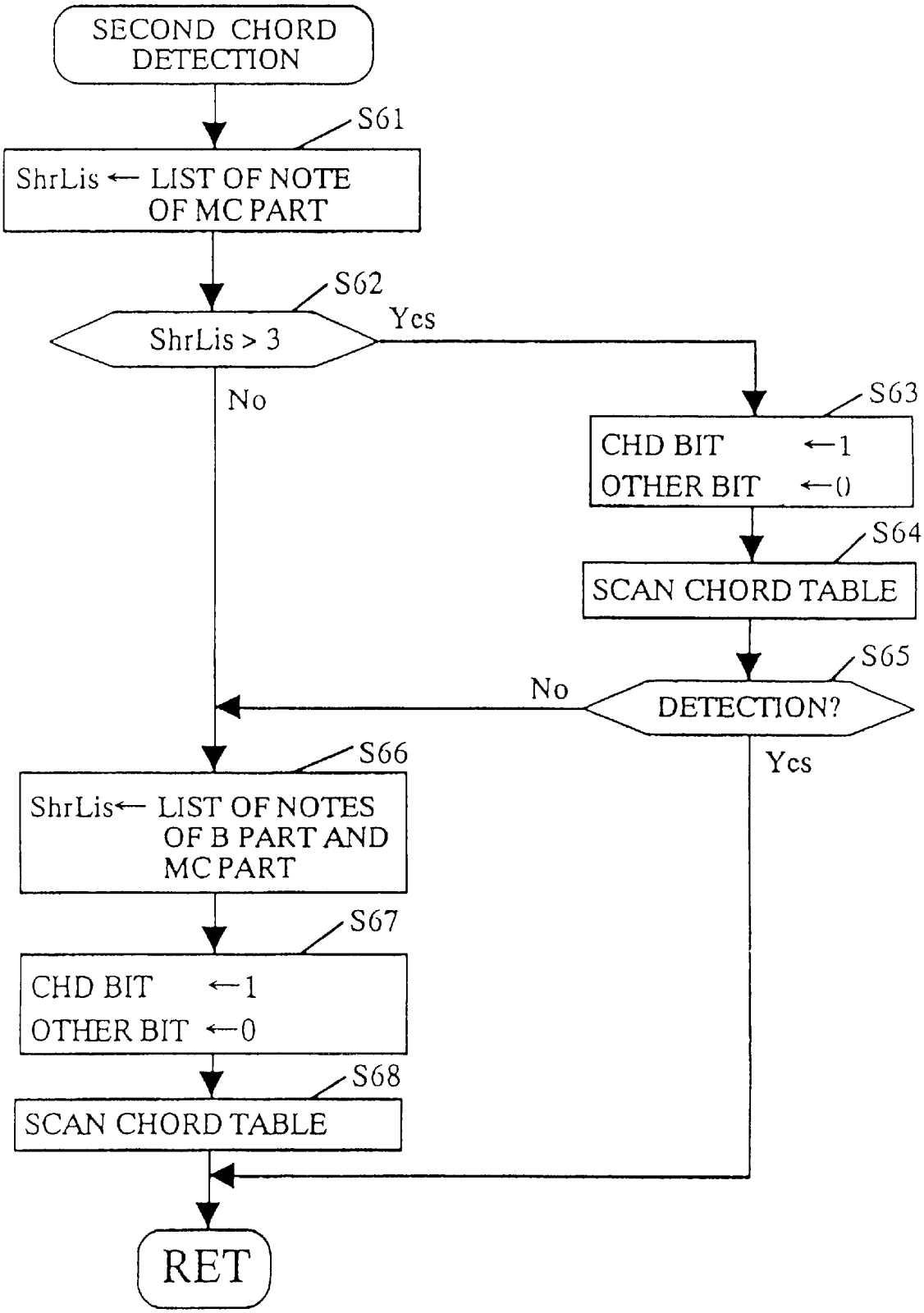
FIG. 13 is a flow chart of a second chord detection routine of the program.

In processing of the chord detection routine shown in FIG. 13, the CPU 1 sets at step S61 a list of notes of the melody part with redundant existence of the same notes omitted as the list "ShrLis" and determines at step S62 whether the elements of the list "ShrLis" are more than three (3) or not. If the answer at step S62 is "No", the program proceeds to step S66. If the answer at step S62 is "Yes", the CPU 1 excutes processing at step S63, S64 to detect a chord in the same manner as the processing at step S53 and S54. At the following step S65, the CPU 1 determines whether the chord detection has been successful or not. If the answer a( step S65 is "Yes", the program returns to the main routine. If the answer at step S65 is "No", the program proceeds to step S66 where the CPU 1 sets a list of notes of the bass part and melody tones part with redundant existence of the same notes omitted as the list "ShrLis". Thus, the CPU 1 executes processing at step S67 and S68 to detect a chord in the same manner as the processing at step S53 and S54 and returns the program to the main routine.

With the foregoing processing, the key codes of depressed key tones are analyzed into the four performance parts different in tone areas in accordance with performance of the keyboard, and a chord is detected on a basis of the analyzed performance parts. This is effective to facilitate detection or the chord.

Although in the above embodiment the depressed key tones have been adapted as performance information to effect the performance part analysis, other information applied from other external equipment or memory may be adapted to effect the performance part analysis. In addition, it is apparent that the timing of the performance can he detected by a measure line memorized in the information.

Although in the above embodiment the whole analysis list has been renewed at each processing of the interruption routine to detect a chord, it is apparent that the analyzed performance parts can be successively memorized in the whole analysis list to accumulate a result or the performance part analyses. Although in the above embodiment the analyzed performance parts have been adapted to detect a chord for automatic accompaniment, information of the automatic performance may be analyzed into a plurality of performance parts and memorized to mute a desired performance part from the memorized performance parts for the automatic performance. This is effective to provide a minus-one function to the electronic musical instrument.

What is claimed is:

1. A performance information analyzer, comprising:

input means provided to be applied with a plurality of tone pitch information data in response to progress of performance of a musical tune;

detection means for detecting the number of the tone pitch information data simultaneously applied to said input means;

analysis means for analyzing the tone pitch information data into a plurality of performance parts in accordance with the detected number of the tone pitch information data, wherein the plurality of performance parts comprise at least one of a bass part, a bass chord part, a melody chord part and a melody part, said analysis means being adapted to analyze one of the tone pitch formation data into one or the performance parts based on a difference in tone pitch between the one of the tone pitch information data and reference tone pitch information data previously assigned to a predetermined part of the performance parts during prior analysis of the tone pitch information data and to analyze the other tone pitch information data into the other performance parts based on a difference in tone pitch between the analyzed tone pitch information data and each of the other tone pitch information data.

2. A performance information analyzer as recited in claim 1, wherein said analysis means includes means for substituting the analyzed tone pitch information data for the reference tone pitch information data in response to progress of performance or the musical tune.

3. A performance information analyzer as recited in claim 1, wherein said analysis means includes first means for analyzing one of the tone pitch information data into one of plural performance parts based on a predetermined tone pitch and a difference in tone pitch between the one of the tone pitch information data and reference tone pitch information data previously assigned to a predetermined part of the plural performance parts if a timing of the tone pitch information data is a measure head and second means for analyzing one of the tone pitch information data into one of the plural performance parts based on the difference in tone pitch if the timing of the tone pitch information is not the measure head.

4. A performance information analyzer as recited in claim 1, wherein said analysis means is adapted for use in combination with a chord detection device for detecting a chord based on the analyzed performance parts.

5. A performance information analyzer, comprising:

input means provided to be applied with first tone pitch information data produced by depression of a single key on a keyboard or second tone pitch information data produced by simultaneous depression of plural keys on the keyboard in response to progress of performance of a musical tune;

first analysis means for analyzing the first tone pitch information data into one of plural performance parts, wherein the plurality of performance parts comprise at least one of a bass part, a bass chord part, a melody chord part and a melody part, based on a difference in tone pitch between the first tone pitch information and a reference tone pitch information data previously assigned to a predetermined part of the plural performance parts during prior analysis of the first or second tone pitch information data; and second analysis means for analyzing one of the second tone pitch information data into one of the plural performance parts, wherein the plurality of performance parts comprise at least one of a bass part, a bass chord part, a melody chord part and a melody part, based on a difference in tone pitch between the one of the second tone pitch information data and the reference tone pitch information data and for analyzing the other second tone pitch information data into the other performance parts based on a difference in tone pitch between the analyzed tone pitch information data and each or the other second tone pitch information data.

6. A performance information analyzer as recited in claim 1, wherein the reference tone pitch information data is successively assigned to the bass part in response to progress of performance of the musical tune.

7. A performance information analyzer as recited in claim 6, wherein said analysis means includes means for assigning the first tone pitch information data or one of the second tone pitch information data to the bass part or the melody part if there is not any reference tone pitch information data at an initial stage of performance of the musical tune.

*8. A performance information analyzer for analyzing tone pitch information representing tones which constitute a progression of a musical performance to determine which one of a plurality of performance parts each of the tones in the progression belongs to, comprising:*

*input means for receiving tone pitch information data representative of tone pitches which constitute a progression of a musical performance to be analyzed, wherein which one of a plurality of performance parts to which each of said tone pitches belongs to is undetermined;*

*detection point providing means for providing a plurality of points for detection allotted in sequence along said progression of the musical performance;*

*tone pitch detection means for detecting, at one point after another among said points, a tone pitch or pitches of at least one inputted tone pitch information data existing at each detection point;*

*analysis means, including at least one analyzing algorithm, for analyzing the tone pitch information data using said analyzing algorithm to determine which of a plurality of performance parts each of said detected tone pitches belongs to, wherein the plurality of performance parts comprise a bass part, a chord part and a melody part;*

*analysis result storing means for storing data indicating the determined performance part for each of the analyzed tone pitches; and*

*output means for delivering said stored data as the analysis result with respect to each said tone pitch;*

*said analyzing algorithm including a step of comparing the tone pitch under analysis with the data of a previous analysis result stored in said analysis result storing means.*

*9. A performance information analyzer as claimed in claim 8, wherein*

*said analyzing algorithm includes a step of comparing the tone pitch under analysis with the data of a previous analysis result stored in said analysis result storing means for determining a belonging performance part of the tone pitch under analysis, and further includes a step of re-analyzing the previously determined performance part of a stored previously analyzed tone pitch to newly determine a belonging performance part for said tone pitch thereby rewriting the stored data in said analysis result storing means.*

*10. A performance information analyzer for analyzing tone pitch information representing tones which constitute a progression of a musical performance to determine which one of a plurality of performance parts each of the tones in the progression belongs to, comprising:*

*input means for receiving tone pitch information data representative of tone pitches which constitute a progression of a musical performance to be analyzed, wherein which one of a plurality of performance parts to which each of said tone pitches belongs to is undetermined;*

*detection point providing means for providing a plurality of points for detection allotted in sequence along said progression of the musical performance;*

*tone pitch detection means for detecting, at one point after another among said points, a tone pitch or pitches of at least one inputted tone pitch information data existing at each detection point;*

*tone number detection means for detecting the number of tone pitches as detected by said tone pitch detection means at said each detection point;*

*analysis means, including a plurality of analyzing algorithms depending on the number of detected tone pitches, for analyzing the tone pitch information data based on the detected number of tone pitches using one of said analyzing algorithms which corresponds to said detected number of tone pitches at each detection point to determine which of a plurality of performance parts each of said detected tone pitches belongs to, wherein the plurality of performance parts comprise a bass part, a chord part and a melody part;*

*analysis result storing means for storing data indicating the determined performance part for each of the analyzed tone pitches; and*

*output means for delivering said stored data as the analysis result with respect to each said tone pitch.*

*11. A performance information analyzer for analyzing tone pitch information representing tones which constitute a progression of a musical performance to determine which one of a plurality of performance parts each of the tones in the progression belongs to, comprising:*

*input means for receiving tone pitch information data representative of tone pitches which constitute a progression of a musical performance to be analyzed, wherein which one of a plurality of performance parts to which each of said tone pitches belongs to is undetermined;*

*detection point providing means for providing a plurality of points for detection allotted in sequence along said progression of the musical performance;*

*tone pitch detection means for detecting, at one point after another among said points, a tone pitch or pitches of at least one inputted tone pitch information data existing at each detection point;*

*analysis means, including at least one analyzing algorithm, for analyzing the tone pitch information data using said analyzing algorithm to determine which of a plurality of performance parts each of said detected tone pitches belongs to, wherein the plurality of performance parts comprise a bass part, a chord part and a melody part;*

*analysis result storing means for storing data indicating the determined performance part for each of the analyzed tone pitches; and*

*output means for delivering said stored data as the analysis result with respect to each said tone pitch;*

*said analysis means including at least an analyzing algorithm which is used to analyze the tone pitch information data in case more than one tone pitches are detected at a time, said analyzing algorithm is to first determine temporarily the performance part to which one of said more than one tone pitches belongs and next to determine the performance part for all of said more than one tone pitches with reference to said temporarily determined performance part for said one of said more than one tone pitches, wherein said temporarily determined performance part may be changed to another performance part in case a better assignment should be found in the course of analyzing the rest of said more than one tone pitches.*

*12. A performance information analyzer as claimed in claim 11, wherein*

*said analyzing algorithm determines the performance part for each of said more than one tone pitches using an amount of tone pitch difference between the tone pitch for which the performance part has been temporarily determined and the tone pitches of the rest of said more than one tone pitches.*

*13. A performance information analyzer for analyzing tone pitch information representing tones which constitute a progression of a musical performance to determine which one of a plurality of performance parts each of the tones in the progression belongs to, comprising:*

*input means for receiving tone pitch information data representative of tone pitches which constitute a progression of a musical performance to be analyzed, wherein which one of a plurality of performance parts to which each of said tone pitches belongs to is undetermined;*

*musical time defining means for defining a time progress with respect to said progression of a musical performance to be analyzed, said time progress including musically different timings of measure heads, strong beats and weak beats;*

*detection point providing means for providing a plurality of points for detection in said time progress, said points being allotted in sequence along said progression of the musical performance;*

*tone pitch detection means for detecting, at one point after another among said points, a tone pitch or pitches of at least one inputted tone pitch information data existing at each detection point;*

*analysis means, including a plurality of different analyzing algorithms depending on said different timings for analyzing the tone pitch information data based on the musical timing using one of said analyzing algorithms which corresponds to said musical timing as the detection point to determine which of a plurality of performance parts each of said detected tone pitches belongs to, wherein the plurality of performance parts comprise a bass part, a chord part and a melody part;*

*analysis result storing means for storing data indicating the determined performance part for each of the analyzed tone pitches; and*

*output means for delivering said stored data as the analysis result with respect to each said tone pitch.*

*14. A performance information analyzer for analyzing tone pitch information representing tones which constitute a progression of a musical performance to determine which one of a plurality of performance parts each of the tones in the progression belongs to, comprising:*

*input means for receiving tone pitch information data representative of tone pitches which constitute a progression of a musical performance to be analyzed, wherein which one of a plurality of performance parts to which each of said tone pitches belongs to is undetermined;*

*detection point providing means for providing a plurality of points for detection allotted in sequence along said progression of the musical performance;*

*tone pitch detection means for detecting, at one point after another among said points, a tone pitch or pitches of at least one inputted tone pitch information data existing at each detection point;*

*analysis means including at least one analyzing algorithm for analyzing the tone pitch information data using said analyzing algorithm to determine which of a plurality of performance parts each of said detected tone pitches belongs to, wherein the plurality of performance parts comprise a bass part, a chord part and a melody part;*

*analysis result storing means for storing data indicating the determined performance part for each of the analyzed tone pitches; and*

*chord detection means, including a chord detection algorithm, for detecting a chord based on the analyzed tone pitches in the respectively determined performance parts using said chord detection algorithm, wherein said chord detection algorithm is such that the chord detection is made based on the tone pitches which have been determined to belong to said chord part as long as said tone pitches which have been determined to belong to said chord part are sufficient for detecting a chord and if not the chord detection is made based on the tone pitches of the chord part and the tone pitches of any other performance parts in combination.*

*15. A performance information analyzer for analyzing tone pitch information representing tones which constitute a progression of a musical performance to determine which one of a plurality of performance parts each of the tones in the progression belongs to, comprising:*

*input means receiving tone pitch information data representative of tone pitches which constitute a progression of a musical performance to be analyzed, wherein which one of a plurality of performance parts to which each of said tone pitches belongs to is undetermined,*

*detection point providing means for providing a plurality of points for detection allotted in sequence along said progression of the musical performance;*

*tone pitch detection means for detecting at one point after another among said points a tone pitch or pitches of at least one inputted tone pitch information data existing at each detection point;*

*analysis means, including at least one analyzing algorithm for analyzing the tone pitch information data using said analyzing algorithm to determine which of a plurality of performance parts each of said detected tone pitches belongs to, wherein the performance parts comprise a bass part, a bass chord part a melody chord part and a melody part;*

*analysis result storing means for storing data indicating the determined performance part for each of the analyzed tone pitches; and*

*output means for delivering said stored data as the analysis result with respect to each said tone pitch.*

*16. A performance information analyzer for analyzing tone pitch information representing tones which constitute a progression of a musical performance to determine which one of a plurality of performance parts each of the tones in the progression belongs to comprising;*

*input means receiving tone pitch information data representative of tone pitches which constitute a progression of a musical performance to be analyzed wherein which one of a plurality of performance parts to which each of said tone pitches belongs to is undetermined;*

*detection point providing means for providing a plurality of points for detection allotted in sequence along said progression of the musical performance;*

*tone pitch detection means for detecting at one point after another among said points, a tone pitch or pitches of at least one inputted tone pitch information data existing at each detection point;*

*analysis means, including at least one analyzing algorithm, for analyzing the tone pitch information data using said analyzing algorithm to determine which of a plurality of performance parts each of said detected tone pitches belongs to, wherein the performance parts comprise at least two of a bass part, a bass chord part, a melody chord part and a melody part;*

*analysis result storing means for storing data indicating the determined performance part for each of the analyzed tone pitches; and*

*output means for delivering said stored data as the analysis result with respect to each said tone pitch;*

*said analyzing algorithm including a step of comparing the tone pitch under analysis with the data of a previous analysis result stored in said analysis result storing means.*

*17. A performance information analyzer as claimed in claim 16, wherein*

*said analyzing algorithm includes a step of comparing the tone pitch under analysis with the data of a previous analysis result stored in said analysis result storing means for determining a belonging performance part of the tone pitch under analysis, and further includes a step of re-analyzing the previously determined performance part of a stored previously analyzed tone pitch to newly determine a belonging performance part for said tone pitch thereby rewriting the stored data in said analysis result storing means.*

*18. A performance information analyzer for analyzing tone pitch information representing tones which constitute a progression of a musical performance to determine which one of a plurality of performance parts each of the tones in the progression belongs to, comprising;*

*input means for receiving tone pitch information data representative of tone pitches which constitute a progression of a musical performance to be analyzed wherein which one of a plurality of performance parts to which each of said tone pitches belongs to is undetermined;*

*detection point providing means for providing a plurality of points for detection allotted in sequence along said progression of the musical performance;*

*tone pitch detection means for detecting at one point after another among said points a tone pitch or pitches of at least one inputted tone pitch information data existing at each detection point;*

*tone number detection means for detecting the number of tone pitches as detected by said tone pitch detection means at said each detection point;*

*analysis means, including a plurality of analyzing algorithms depending on the number of detected tone pitches, for analyzing the tone pitch information data based on the detected number of tone pitches using one of said analyzing algorithms which corresponds to said detected number of tone pitches at each detection point to determine which of a plurality of performance parts each of said detected tone pitches belongs to, wherein the plurality of performance parts comprise a bass part, a bass chord part, a melody chord part and a melody part;*

*analysis result storing means for storing data indicating the determined performance part for each of the analyzed tone pitches; and*

*output means for delivering said stored data as the analysis result with respect to each said tone pitch.*

*19. A performance information analyzer for analyzing tone pitch information representing tones which constitute a progression of a musical performance to determine which one of a plurality of performance parts each of the tones in the progression belongs to, comprising:*

*input means for receiving tone pitch information data representative of tone pitches which constitute a progression of a musical performance to be analyzed, wherein which one of a plurality of performance parts to which each of said tone pitches belongs to is undetermined;*

*detection point providing means for providing a plurality of points for detection allotted in sequence along said progression of the musical performance;*

*tone pitch detection means for detecting, at one point after another among said points, a tone pitch or pitches of at least one inputted tone pitch information data existing at each detection point;*

*analysis means, including at least one analyzing algorithm, for analyzing the tone pitch information data using said analyzing algorithm to determine which of a plurality of performance parts each of said detected tone pitches belongs to, wherein the plurality of performance parts comprise a bass part, a bass chord part, a melody chord part and a melody part;*

*analysis result storing means for storing data indicating the determined performance part for each of the analyzed tone pitches; and*

*output means for delivering said stored data as the analysis result with respect to each said tone pitch;*

*said analysis means including at least an analyzing algorithm which is used to analyze the tone pitch information data in case more than one tone pitches are*

*detected at a time, said analyzing algorithm is to first determine temporarily the performance part to which one of said more than one tone pitches belongs; and next to determine the performance part for all of said more than one tone pitches with reference to said temporarily determined performance part for said one of said more than one tone pitches, wherein said temporarily determined performance part may be changed to another performance part in case a better assignment should be found in the course of analyzing the rest of said more than one tone pitches.*

*20. A performance information analyzer as claimed in claim 19, wherein*

*said analyzing algorithm determines the performance part for each of said more than one tone pitches using an amount of tone pitch difference between the tone pitch for which the performance part has been temporarily determined and the tone pitches of the rest of said more than one tone pitches.*

*21. A performance information analyzer for analyzing tone pitch information representing tones which constitute a progression of a musical performance to determine which one of a plurality of performance parts each of the tones in the progression belongs to, comprising:*

*input means for receiving tone pitch information data representative of tone pitches which constitute a progression of a musical performance to be analyzed, wherein which one of a plurality of performance parts to which each of said tone pitches belongs to is undetermined;*

*musical time defining means for defining a time progress with respect to said progression of a musical performance to be analyzed, said time progress including musically different timings of measure heads, strong beats and weak beats;*

*detection point providing means for providing a plurality of points for detection in said time progress, said points being allotted in sequence along said progression of the musical performance;*

*tone pitch detection means for detecting, at one point after another among said points, a tone pitch or pitches of at least one inputted tone pitch information data existing at each detection point;*

*analysis means, including a plurality of different analyzing algorithms depending on said different timings for analyzing the tone pitch information data based on the musical timing using one of said analyzing algorithms which corresponds to said musical timing as the detection point to determine which of a plurality of performance parts each of said detected tone pitches belongs to, wherein the plurality of performance parts comprise a bass part, a chord part and a melody part;*

*analysis result storing means for storing data indicating the determined performance part for each of the analyzed tone pitches; and*

*output means for delivering said stored data as the analysis result with respect to each said tone pitch.*

*22. A performance information analyzer for analyzing tone pitch information representing tones which constitute a progression of a musical performance to determine which one of a plurality of performance parts each of the tones in the progression belongs to, comprising:*

*input means for receiving tone pitch information data representative of tone pitches which constitute a progression of a musical performance to be analyzed, wherein which one of a plurality of performance parts to which each of said tone pitches belongs to is undetermined;*

*detection point providing means for providing a plurality of points for detection allotted in sequence along said progression of the musical performance;*

*tone pitch detection means for detecting, at one point after another among said points, a tone pitch or pitches of at least one inputted tone pitch information data existing at each detection point;*

*analysis means, including at least one analyzing algorithm, for analyzing the tone pitch information data using said analyzing algorithm to determine which of a plurality of performance parts each of said detected tone pitches belongs to, wherein the plurality of performance parts comprise a bass part, a bass chord part, a melody chord part and a melody part;*

*analysis result storing means for storing data indicating the determined performance part for each of the analyzed tone pitches; and*

*chord detection means, including a chord detection algorithm, for detecting a chord based on the analyzed tone pitches in the respectively determined performance parts using said chord detection algorithm, wherein said chord detection algorithm is such that the chord detection is made based on the tone pitches which have determined to belong to said chord part as long as said tone pitches which have determined to belong to said chord part are sufficient for detecting a chord and if not the chord detection is made based on the tone pitches of the chord part and the tone pitches of any other performance parts in combination.*

*23. A performance information analyzer for analyzing tone pitch information representing tones which constitute a progression of a musical performance to determine which one of a plurality of performance parts each of the tones in the progression belongs to, comprising:*

*input means for receiving tone pitch information data representative of tone pitches which constitute a progression of a musical performance to be analyzed, wherein which one of a plurality of performance parts to which each of said tone pitches belongs to is undetermined;*

*detection point providing means for providing a plurality of points for detection allotted in sequence along said progression of the musical performance;*

*tone pitch detection means for detecting! at one point after another among said points, a tone pitch or pitches of at least one inputted tone pitch information data existing at each detection point;*

*analysis means, including at least one analyzing algorithm, for analyzing the tone pitch information data using said analyzing algorithm to determine which of a plurality of performance parts each of said detected tone pitches belongs to, wherein the plurality of performance parts comprise a bass part, a bass chord part, a melody chord part and a melody part;*

*analysis result storing means for storing data indicating the determined performance part for each of the analyzed tone pitches; and*

*chord detection means, including a chord detection algorithm, for detecting a chord based on the analyzed tone pitches in the respectively determined performance parts using said chord detection algorithm, wherein said chord detection algorithm is such that, in case both of the tone pitches analyzed to be in the bass chord part and the tone pitches analyzed to be in the melody chord part have sufficient information for*

*detecting chords, respectively, the tone pitches analyzed to be in the bass chord part are used in preference to the tone pitches analyzed to be in the melody chord part in detecting a chord.*

*24. A performance information analyzer as claimed in one of claims 8, 9, 10, 11, 12, 13, 14, 15, 16, 17, 18, 19, 20, 21, 22 and 23, wherein:*

*said inputted plurality of tone pitch information data are from tones in a real time musical performance;*

*said detection point providing means includes tempo defining means for defining a tempo of musical time progression in the analyzer, said tempo being selectable, and detection timing providing means for providing a plurality of timings for detection allotted in sequence along said progression of the real time musical performance, and*

*said analysis means determines the performance parts for the detected tone pitches in real time alone with the real time music performance.*

*25. A performance information analyzer as claimed in one of claims 8, 9, 10, 11, 12, 13, 15, 16, 17, 18, 19, 20 and 21, further comprising:*

*chord detection means, including, a chord detection algorithm, for detecting a chord based on the analyzed tone pitches in the respectively determined performance parts using said chord detection algorithm.*

*26. A performance information analyzer for analyzing tone pitch information representing tones which constitute a progression of a musical performance to determine which one of a plurality of performance parts each of the tones in the progression belongs to, comprising:*

*an input device which receives tone pitch information data representative of tone pitches which constitute a progression of a musical performance to be analyzed, wherein which one of a plurality of performance parts to which each of said tone pitches belongs to is undetermined;*

*a detection point provider which provides a plurality of points for detection allotted in sequence along said progression of the musical performance;*

*a tone pitch detector which detects, at one point after another among said points, a tone pitch or pitches of at least one inputted tone pitch information data existing at each detection point;*

*an analyzing device, including at least one analyzing algorithm which analyzes the tone pitch information data using said analyzing algorithm to determine which of a plurality of performance parts each of said detected tone pitches belongs to wherein the plurality of performance parts comprise a bass part a chord part and a melody part;*

*an analysis result storing device which stores data indicating the determined performance part for each of the analyzed tone pitches; and*

*an output device which delivers said stored data as the analysis result with respect to each said tone pitch;*

*said analyzing algorithm including a step of comparing the tone pitch under analysis with the data of a previous analysis result stored in said analysis result storing device.*

*27. A performance information analyzer for analyzing tone pitch information representing tones which constitute a progression of a musical performance to determine which one of a plurality of performance parts each of the tones in the progression belongs to comprising:*

*an input device which receives tone pitch information data representative of tone pitches which constitute a progression of a musical performance to be analyzed, wherein which one of a plurality of performance parts to which each of said tone pitches belongs to is undetermined;*

*a detection point provider which provides a plurality of points for detection allotted in sequence along said progression of the musical performance;*

*a tone pitch detector which detects at one point after another among said points a tone pitch or pitches of at least one inputted tone pitch information data existing at each detection point;*

*a tone number detector which detects the number of tone pitches as detected by said tone pitch detector at said each detection point;*

*an analyzing device including a plurality of analyzing algorithms depending on the number of detected tone pitches which analyzes the tone pitch information data based on the detected number of tone pitches using one of said analyzing algorithms which corresponds to said detected number of tone pitches at each detection point to determine which of a plurality of performance parts each of said detected tone pitches belongs to, wherein the plurality of performance parts comprise a bass part, a chord part and a melody part;*

*an analysis result storing device which stores data indicating the determined performance part for each of the analyzed tone pitches; and*

*an output device which delivers said stored data as the analysis result with respect to each said tone pitch.*

*28. A performance information analyzer for analyzing tone pitch information representing tones which constitute a progression of a musical performance to determine which one of a plurality of performance parts each of the tones in the progression belongs to, comprising:*

*an input device which receives tone pitch information data representative of tone pitches which constitute a progression of a musical performance to be analyzed, wherein which one of a plurality of performance parts to which each of said tone pitches belongs to is undetermined;*

*a detection point provider which provides a plurality of points for detection allotted in sequence along said progression of the musical performance;*

*a tone pitch detector which detects, at one point after another among said points, a tone pitch or pitches of at least one inputted tone pitch information data existing at each detection point;*

*an analyzing device, including at least one analyzing; algorithm, which analyzes the tone pitch information data using said analyzing algorithm to determine which of a plurality of performance parts each of said detected tone pitches belongs to, wherein the plurality of performance parts comprise a bass part a chord part and a melody part;*

*an analysis result storing device which stores data indicating the determined performance part for each of the analyzed tone pitches; and*

*an output device which delivers said stored data as the analysis result with respect to each said tone pitch;*

*said analyzing device including at least an analyzing algorithm which is used to analyze the tone pitch information data in case more than one tone pitches are detected at a time, said analyzing algorithm is to first*

*determine temporarily the performance part to which one of said more than one tone pitches belongs and next to determine the performance part for all of said more than one tone pitches with reference to said temporarily determined performance part for said one of said more than one tone pitches, wherein said temporarily determined performance part may be changed to another performance part in case a better assignment should be found in the course of analyzing the rest of said more than one tone pitches.*

*29. A performance information analyzer for analyzing tone pitch information representing tones which constitute a progression of a musical performance to determine which one of a plurality of performance parts each of the tones in the progression belongs to, comprising:*

*an input device which receives tone pitch information data representative of tone pitches which constitute a progression of a musical performance to be analyzed, wherein which one of a plurality of performance parts to which each of said tone pitches belongs to is undetermined;*

*a musical time defining device which defines a time progress with respect to said progression of a musical performance to be analyzed said time progress including musically different timings of measure heads, strong beats and weak beats;*

*a detection point provider which provides a plurality of points for detection in said time progress, said points being allotted in sequence along said progression of the musical performance;*

*a tone pitch detector which detects, at one point after another among said points, a tone pitch or pitches of at least one inputted tone pitch information data existing at each detection point;*

*an analyzing device, including a plurality of different analyzing algorithms depending on said different timings, which analyzes the tone pitch information data based on the musical timing using one of said analyzing algorithms which corresponds to said musical timing as the detection point to determine which of a plurality of performance parts each of said detected tone pitches belongs to, wherein the plurality of performance parts comprise a bass part, a chord part and a melody part;*

*an analysis result storing device which stores data indicating the determined performance part for each of the analyzed tone pitches; and*

*an output device which delivers said stored data as the analysis result with respect to each said tone pitch.*

*30. A performance information analyzer for analyzing tone pitch information representing tones which constitute a progression of a musical performance to determine which one of a plurality of performance parts each of the tones in the progression belongs to, comprising:*

*an input device which receives tone pitch information data representative of tone pitches which constitute a progression of a musical performance to be analyzed wherein which one of a plurality of performance parts to which each of said tone pitches belongs to is undetermined;*

*a detection point provider which provides a plurality of points for detection allotted in sequence along said progression of the musical performance;*

*a tone pitch detector which detects, at one point after another among said points, a tone pitch or pitches of at least one inputted tone pitch information data existing at each detection point;*

*an analyzing device, including at least one analyzing algorithm, which analyzes the tone pitch information data using said analyzing algorithm to determine which of a plurality of performance parts each of said detected tone pitches belongs to, wherein the plurality of performance parts comprise a bass part, a chord part and a melody part;*

*an analysis result storing device which stores data indicating the determined performance part for each of the analyzed tone pitches; and*

*a chord detector including a chord detection algorithm, which detects a chord based on the analyzed tone pitches in the respectively determined performance parts using said chord detection algorithm wherein said chord detection algorithm is such that the chord detection is made based on the tone pitches which have been determined to belong to said chord part as long as said tone pitches which have been determined to belong to said chord part are sufficient for detecting a chord and if not the chord detection is made based on the tone pitches of the chord part and the tone pitches of any other performance parts in combination.*

*31. A performance information analyzer for analyzing tone pitch information representing tones which constitute a progression of a musical performance to determine which one of a plurality of performance parts each of the tones ill the progression belongs to, comprising:*

*an input device which receives tone pitch information data representative of tone pitches which constitute a progression of a musical performance to be analyzed, wherein which one of a plurality of performance parts to which each of said tone pitches belongs to is undetermined;*

*a detection point provider which provides a plurality of points for detection allotted in sequence along said progression of the musical performance;*

*a tone pitch detector which detects, at one point after another among said points, a tone pitch or pitches of at least one inputted tone pitch information data existing at each detection point;*

*an analyzing device, including at least one analyzing algorithm, which analyzes the tone pitch information data using said analyzing algorithm to determine which of a plurality of performance parts each of said detected tone pitches belongs to, wherein the performance parts comprise a bass part, a bass chord part, a melody chord part and a melody part;*

*an analysis result storing device which stores data indicating the determined performance part for each of the analyzed tone pitches; and*

*an output device which delivers said stored data as the analysis result with respect to each said tone pitch.*

*32. A performance information analyzer for analyzing tone pitch information representing tones which constitute a progression of a musical performance to determine which one of a plurality of performance parts each of the tones in the progression belongs to, comprising:*

*an input device which receives a plurality of tone pitch information data representative of tone pitches which constitute a progression of a musical performance to be analyzed, wherein which one of a plurality of performance parts to which each of said tone pitches belongs to is undetermined;*

*a detection point provider which provides a plurality of points for detection allotted in sequence along said progression of the musical performance;*

*a tone pitch detector which detects, at one point after another among said points, a tone pitch or pitches of at least one inputted tone pitch information data existing at each detection point;*

*an analyzing device, including at least one analyzing algorithm which analyzes the tone pitch information data using said analyzing algorithm to determine which of a plurality of performance parts each of said detected tone pitches belongs to, wherein the performance parts comprise a bass part, a bass chord part, a melody chord part and a melody part;*

*an analysis result storing device which stores data indicating the determined performance part for each of the analyzed tone pitches; and*

*an output device which delivers said stored data as the analysis result with respect to each said tone pitch;*

*said analyzing algorithm including a step of comparing the tone pitch under analysis with the data of a previous analysis result stored in said analysis result storing device.*

*33. A performance information analyzer for analyzing tone pitch information representing tones which constitute a progression of a musical performance to determine which one of a plurality of performance parts each of the tones in the progression belongs to, comprising:*

*an input device which receives tone pitch information data representative of tone pitches which constitute a progression of a musical performance to be analyzed wherein which one of a plurality of performance parts to which each of said tone pitches belongs to is undetermined;*

*a detection point provider which provides a plurality or points for detection allotted in sequence along said progression of the musical performance;*

*a tone pitch detector which detects, at one point after another among said points, a tone pitch or pitches of at least one inputted tone pitch information data existing at each detection point;*

*a tone number detector which detects the number of tone pitches as detected by said tone pitch detection means at said each detection point;*

*an analyzing device, including a plurality of analyzing algorithms depending on the number of detected tone pitches, which analyzes the tone pitch information data based on the detected number of tone pitches using one of said analyzing algorithms which corresponds to said detected number of tone pitches at each detection point to determine which of a plurality of performance parts each of said detected tone pitches belongs to, wherein the plurality of performance parts comprise a bass part, a bass chord part, a melody chord part and a melody part;*

*an analysis result storing device which stores data indicating the determined performance part for each of the analyzed tone pitches; and*

*an output device which delivers said stored data as the analysis result with respect to each said tone pitch.*

*34. A performance information analyzer for analyzing tone pitch information representing tones which constitute a progression of a musical performance to determine which one of a plurality of performance parts each of the tones in the progression belongs to, comprising:*

*an input device which receives tone pitch information data representative of tone pitches which constitute a progression of a musical performance to be analyzed, wherein which one of a plurality of performance parts to which each of said tone pitches belongs to is undetermined;*

*a detection point provider which provides a plurality of points for detection allotted in sequence along said progression of the musical performance;*

*a tone patch detector which detects, at one point after another among said points, a tone pitch or pitches of at least one inputted tone pitch information data existing at each detection point;*

*an analyzing device, including at least one analyzing algorithm, which analyzes the tone pitch information data using said analyzing algorithm to determine which of a plurality of performance parts each of said detected tone pitches belongs to, wherein the plurality of performance parts comprise a bass part, a bass chord part, a melody chord part and a melody part;*

*an analysis result storing device which stores data indicating the determined performance part for each of the analyzed tone pitches, and*

*an output device which delivers said stored data as the analysis result with respect to each said tone pitch;*

*said analyzing device including at least an analyzing algorithm which is used to analyze the tone pitch information data in case more than one tone pitches are detected at a time, said analyzing algorithm is to first determine temporarily the performance part to which one of said more than one tone pitches belongs and next to determine the performance part for all of said more than one tone pitches with reference to said temporarily determined performance part for said one of said more than one tone pitches, wherein said temporarily determined performance part may be changed to another performance part in case a better assignment should be found in the course of analyzing the rest of said more than one tone pitches.*

*35. A performance information analyzer for analyzing tone pitch information representing tones which constitute a progression of a musical performance to determine which one of a plurality of performance parts each of the tones in the progression belongs to, comprising:*

*an input device which receives a plurality of tone pitch information data representative of tone pitches which constitute a progression of a musical performance to be analyzed, wherein which one of a plurality of performance parts to which each of said tone pitches belongs to is undetermined;*

*a musical time defining device which defines a time progress with respect to said progression of a musical performance to be analyzed, said time progress including musically different timings of measure heads strong beats and weak beats;*

*a detection point provider which provides a plurality of points for detection in said time progress, said points being allotted in sequence along said progression of the musical performance;*

*a tone pitch detector which detects, at one point after another among said points, a tone pitch or pitches of at least one inputted tone pitch information data existing at each detection point;*

*an analyzing device, including a plurality of different analyzing algorithms depending on said different timings, which analyzes the tone pitch information data based on the musical timing using one of said analyzing algorithms which corresponds to said musical timing*

*as the detection point to determine which of a plurality of performance parts each of said detected tone pitches belongs to, wherein the plurality of performance parts comprise a bass part, a bass chord part, a melody chord part and a melody part;*

*an analysis result storing device which stores data indicating the determined performance part for each of the analyzed tone pitches; and*

*an output device which delivers said stored data as the analysis result with respect to each said tone pitch.*

*36. A performance information analyzer for analyzing tone pitch information representing tones which constitute a progression of a musical performance to determine which one of a plurality of performance parts each of the tones in the progression belongs to, comprising:*

*an input device which receives tone pitch information data representative of tone pitches which constitute a progression of a musical performance to be analyzed, wherein which one of a plurality of performance parts to which each of said tone pitches belongs to is undetermined;*

*a detection point provider which provides a plurality of points for detection allotted in sequence along said progression of the musical performance;*

*a tone pitch detector which detects, at one point after another among said points, a tone pitch or pitches of at least one inputted tone pitch information data existing at each detection point;*

*an analyzing device, including at least one analyzing algorithm, which analyzes the tone pitch information data using said analyzing algorithm to determine which of a plurality of performance parts each of said detected tone pitches belongs to, wherein the plurality of performance parts comprise a bass part, a bass chord part, a melody chord part and a melody part;*

*an analysis result storing device which stores data indicating the determined performance part for each of the analyzed tone pitches; and*

*a chord detector including a chord detection algorithm, which detects a chord based on the analyzed tone pitches in the respectively determined performance parts using said chord detection algorithm wherein said chord detection algorithm is such that the chord detection is made based on the tone pitches which have been determined to belong to said chord part as long as said tone pitches which have been determined to belong to said chord part are sufficient for detecting a chord and if not the chord detection is made based on the tone pitches of the chord part and the tone pitches of any other performance parts in combination.*

*37. A performance information analyzer for analyzing tone pitch information representing tones which constitute a progression of a musical performance to determine which one of a plurality of performance parts each of the tones in the progression belongs to, comprising:*

*an input device which receives tone pitch information data representative of tone pitches which constitute a progression of a musical performance to be analyzed, wherein which one of a plurality of performance parts to which each of said tone pitches belongs to is undetermined;*

*a detection point provider which provides a plurality of points for detection allotted in sequence along said progression of the musical performance;*

*a tone pitch detector which detects, at one point after another among said points, a tone pitch or pitches of at least one inputted tone pitch information data existing at each detection point;*

*an analyzing device, including at least one analyzing algorithm, which analyzes the tone pitch information data using said analyzing algorithm to determine which of a plurality of performance parts each of said detected tone pitches belongs to, wherein the plurality of performance parts comprise a bass part, a bass chord part, a melody chord part and a melody part;*

*an analysis result storing device which stores data indicating the determined performance part for each of the analyzed tone pitches; and*

*a chord detector, including a chord detection algorithm, which detects a chord based on the analyzed tone pitches in the respectively determined performance parts using said chord detection algorithm, wherein said chord detection algorithm is such that, in case both of the tone pitches analyzed to be in the bass chord part and the tone pitches analyzed to be in the melody chord part have sufficient information for detecting chords, respectively the tone pitches analyzed to be in the bass chord part are used in preference to the tone pitches analyzed to be in the melody chord part in detecting a chord.*

*38. A machine readable medium for use in a system of a data processing type comprising a computer, for analyzing tone pitch information representing tones which constitute a progression of a musical performance to determine which one of a plurality of performance parts each of the tones in the progression belongs to, said medium containing program instructions executable by said computer for executing:*

*an input process of receiving tone pitch information data representative of tone pitches which constitute a progression of a musical performance to be analyzed, wherein which one of a plurality of performance parts to which each of said tone pitches belongs to is undetermined;*

*a detection point providing process of providing a plurality of points for detection allotted in sequence along said progression of the musical performance;*

*a tone pitch detection process of detecting, at one point after another among said points, a tone pitch or pitches of at least one inputted tone pitch information data existing at each detection point,*

*an analysis process, performing at least one analyzing algorithm, for analyzing the tone pitch information data using said analyzing algorithm to determine which of a plurality of performance parts each of said detected tone pitches belongs to, wherein the plurality of performance parts comprise a bass part, a chord part and a melody part; and*

*an analysis result storing process of storing data indicating the determined performance part for each of the analyzed tone pitches;*

*said analyzing algorithm including a step of comparing the tone pitch under analysis with the data of a previous analysis result stored in said analysis result storing means.*

*39. A machine readable medium for use in a system of a data processing type comprising a computer, for analyzing tone pitch information representing tones which constitute a progression of a musical performance to determine which one of a plurality of performance parts each of the tones in the progression belongs to, said medium containing program instructions executable by said computer for executing:*

*an input process of receiving tone pitch information data representative of tone pitches which constitute a progression of a musical performance to be analyzed, wherein which one of a plurality of performance parts to which each of said tone pitches belongs to is undetermined;*

*a detection point providing process of providing a plurality of points for detection allotted in sequence along said progression of the musical performance;*

*a tone pitch detection process of detecting, at one point after another among said points, a tone pitch or pitches of at least one inputted tone pitch information data existing at each detection point;*

*a tone number detection process for detecting the number of tone pitches as detected by said tone pitch detection process at said each detection point;*

*an analysis process, performing a plurality of analyzing algorithms depending on the number of detected tone pitches, for analyzing the tone pitch information data based on the detected number of tone pitches using one of said analyzing algorithms which corresponds to said detected number of tone pitches at each detection point to determine which of a plurality of performance parts each of said detected tone pitches belongs to, wherein the plurality of performance parts comprise a bass part, a chord part and a melody part; and*

*an analysis result storing process of storing data indicating the determined performance part for each of the analyzed tone pitches.*

*40. A machine readable medium for use in a system of a data processing type comprising a computer, for analyzing tone pitch information representing tones which constitute a progression of a musical performance to determine which one of a plurality of performance parts each of the tones in the progression belongs to, said medium containing program instructions executable by said computer for executing:*

*an input process of receiving tone pitch information data representative of tone pitches which constitute a progression of a musical performance to be analyzed, wherein which one of a plurality of performance parts to which each of said tone pitches belongs to is undetermined;*

*a detection point providing process of providing a plurality of points for detection allotted in sequence along said progression of the musical performance;*

*a tone pitch detection process of detecting, at one point after another among said points, a tone pitch or pitches of at least one inputted tone pitch information data existing at each detection point;*

*an analysis process, performing at least one analyzing algorithm, for analyzing the tone pitch information data using said analyzing algorithm to determine which of a plurality of performance parts each of said detected tone pitches belongs to, wherein the plurality of performance parts comprise a bass part, a chord part and a melody part; and*

*an analysis result storing process of storing data indicating the determined performance part for each of the analyzed tone pitches;*

*said at least one analyzing algorithm being for analyzing the tone pitch information data in case more than one tone pitches are detected at a time, said analyzing algorithm is to first determine temporarily the performance part to which one of said more than one tone pitches belongs and next to determine the performance part for all of said more than one tone pitches with reference to said temporarily determined performance part for said one of said more than one tone pitches, wherein said temporarily determined performance part may be changed to another performance part in case a better assignment should be found in the course of analyzing the rest of said more than one tone pitches.*

*41. A machine readable medium for use in a system of a data processing type comprising a computer, for analyzing tone pitch information representing tones which constitute a progression of a musical performance to determine which one of a plurality of performance parts each of the tones in the progression belongs to, said medium containing program instructions executable by said computer for executing:*

*an input process of receiving tone pitch information data representative of tone pitches which constitute a progression of a musical performance to be analyzed, wherein which one of a plurality of performance parts to which each of said tone pitches belongs to is undetermined;*

*a musical time defining process of defining a time progress with respect to said progression of a musical performance to be analyzed, said time progress including musically different timings of measure heads, strong beats and weak beats;*

*a detection point providing process of providing a plurality of points for detection in said time progress, said points being allotted in sequence along said progression of the musical performance;*

*a tone pitch detection process of detecting, at one point after another among said points, a tone pitch or pitches of at least one inputted tone pitch information data existing at each detection point;*

*an analysis process, performing a plurality of different analyzing algorithms depending on said different timings, for analyzing the tone pitch information data based on the musical timing using one of said analyzing algorithms which corresponds to said musical timing as the detection point to determine which of a plurality of performance parts each of said detected tone pitches belongs to, wherein the plurality of performance parts comprise a bass part, a chord part and a melody part; and*

*an analysis result storing process of storing data indicating the determined performance part for each of the analyzed tone pitches.*

*42. A machine readable medium for use in a system of a data processing type comprising a computer, for analyzing tone pitch information representing tones which constitute a progression of a musical performance to determine which one of a plurality of performance parts each of the tones in the progression belongs to, said medium containing program instructions executable by said computer for executing:*

*an input process of receiving tone pitch information data representative of tone pitches which constitute a progression of a musical performance to be analyzed, wherein which one of a plurality of performance parts to which each of said tone pitches belongs to is undetermined;*

*a detection point providing process of providing a plurality of points for detection allotted in sequence along said progression of the musical performance;*

*a tone pitch detection process of detecting at one point after another among said points, a tone pitch or pitches*

*of at least one inputted tone pitch information data existing at each detection point;*

*an analysis process performing at least one analyzing algorithm, for analyzing the tone pitch information data using said analyzing algorithm to determine which of a plurality of performance parts each of said detected tone pitches belongs to, wherein the plurality of performance parts comprise a bass part, a chord part and a melody part;*

*an analysis result storing process of storing data indicating the determined performance part for each of the analyzed tone pitches; and*

*a chord detecting process, performing a chord detection algorithm, for detecting a chord based on the analyzed tone pitches in the respectively determined performance parts using said chord detection algorithm, wherein said chord detection algorithm is such that the chord detection is made based on the tone pitches which have been determined to belong to said chord part as long as said tone pitches which have been determined to belong to said chord part are sufficient for detecting a chord and if not the chord detection is made based on the tone pitches of the chord part and the tone pitches of any other performance parts in combination.*

*43. A machine readable medium for use in a system of a data processing type comprising a computer, for analyzing tone pitch information representing tones which constitute a progression of a musical performance to determine which one of a plurality of performance parts each of the tones in the progression belongs to, said medium containing program instructions executable by said computer for executing:*

*an input process of receiving tone pitch information data which, constitute a progression of a musical performance to be analyzed, wherein which one of a plurality of performance parts to which each of said tone pitches belongs to is undetermined;*

*a detection point providing process of providing a plurality of points for detection allotted in sequence along said progression of the musical performance;*

*a tone pitch detection process of detecting, at one point after another among said points, a tone pitch or pitches of at least one inputted tone pitch information data existing at each detection point;*

*an analysis process, performing at least one analyzing algorithm, for analyzing the tone pitch information data using said analyzing algorithm to determine which of a plurality of performance parts each of said detected tone pitches belongs to wherein the plurality of performance parts comprise a bass part, a bass chord part, a melody chord part and a melody part; and*

*an analysis result storing process of storing data indicating the determined performance part for each of the analyzed tone pitches.*

*44. A machine readable medium for use in a system of a data processing type comprising a computer, for analyzing tone pitch information representing tones which constitute a progression of a musical performance to determine which one of a plurality of performance parts each of the tones in the progression belongs to, said medium containing program instructions executable by said computer for executing:*

*an input process of receiving tone pitch information data representative of tone pitches which constitute a progression of a musical performance to be analyzed wherein which one of a plurality of performance parts to which each of said tone pitches belongs to is undetermined;*

*a detection point providing process of providing a plurality of points for detection allotted in sequence along said progression of the musical performance;*

*a tone pitch detection process of detecting, at one point after another among said points, a tone pitch or pitches of at least one inputted tone pitch information data existing at each detection point;*

*an analysis process, performing at least one analyzing algorithm, for analyzing the tone pitch information data using said analyzing algorithm to determine which of a plurality of performance parts each of said detected tone pitches belongs to, wherein the plurality of performance parts comprise a bass part, a bass chord part, a melody chord part and a melody part; and*

*an analysis result storing process of storing data indicating the determined performance part for each of the analyzed tone pitches;*

*said analyzing algorithm including a step of comparing the tone pitch under analysis with the data of a previous analysis result stored in said analysis result storing process.*

*45. A machine readable medium for use in a system of a data processing type comprising a computer for analyzing tone pitch information representing tones which constitute a progression of a musical performance to determine which one of a plurality of performance parts each of the tones in the progression belongs to said medium containing program instructions executable by said computer for executing:*

*an input process of receiving tone pitch information data representative of tone pitches which constitute a progression of a musical performance to be analyzed, wherein which one of a plurality of performance parts to which each of said tone pitches belongs to is undetermined;*

*a detection point providing process of providing a plurality of points for detection allotted in sequence along said progression of the musical performance;*

*a tone pitch detection process of detecting, at one point after another among said points a tone pitch or pitches of at least one inputted tone pitch information data existing at each detection point;*

*a tone number detection process for detecting the number of tone pitches as detected by said tone pitch detection process at said each detection point;*

*an analysis process performing a plurality of analyzing algorithms depending on the number of detected tone pitches for analyzing the tone pitch information data based on the detected number of tone pitches using one of said analyzing algorithms which corresponds to said detected number of tone pitches at each detection point to determine which of a plurality of performance parts each of said detected tone pitches belongs to wherein the plurality of performance parts comprise a bass part a bass chord part a melody chord part and a melody part; and*

*an analysis result storing process of storing data indicating the determined performance part for each of the analyzed tone pitches.*

*46. A machine readable medium for use in a system of a data processing type comprising a computer for analyzing tone pitch information representing tones which constitute a progression of a musical performance to determine which*

*one of a plurality of performance parts each of the tones in the progression belongs to, said medium containing program instructions executable by said computer for executing:*

*an input process of receiving tone pitch information data representative of tone pitches which constitute a progression of a musical performance to be analyzed, wherein which one of a plurality of performance parts to which each of said tone pitches belongs to is undetermined;*

*a detection point providing process of providing a plurality of points for detection allotted in sequence along said progression of the musical performance;*

*a tone pitch detection process of detecting at one point after another among said points, a tone pitch or pitches of at least one inputted tone pitch information data existing at each detection point;*

*an analysis process, performing at least one analyzing algorithm for analyzing the tone pitch information data using said analyzing algorithm to determine which of a plurality of performance parts each of said detected tone pitches belongs to wherein the plurality of performance parts comprise a bass part, a bass chord part, a melody chord part and a melody part; and*

*an analysis result storing process of storing data indicating the determined performance part for each of the analyzed tone pitches;*

*said at least one analyzing algorithm being for analyzing the tone pitch information data in case more than one tone pitches are detected at a time said analyzing algorithm is to first determine temporarily the performance part to which one of said more than one tone pitches belongs and next to determine the performance part for all of said more than one tone pitches with reference to said temporarily determined performance part for said one of said more than one tone pitches wherein said temporarily determined performance part may be chanted to another performance part in case a better assignment should be found in the course of analyzing the rest of said more than one tone pitches.*

*47. A machine readable medium for use in a system of a data processing type comprising a computer, for analyzing tone pitch information representing tones which constitute a progression of a musical performance to determine which one of a plurality of performance parts each of the tones in the progression belongs to said medium containing program instructions executable by said computer for executing:*

*an input process of receiving tone pitch information data representative of tone pitches which constitute a progression of a musical performance to be analyzed, wherein which one of a plurality of performance parts to which each of said tone pitches belongs to is undetermined;*

*a musical time defining, process of defining a time progress with respect to said progression of a musical performance to be analyzed, said time progress including musically different timings of measure heads strong beats and weak beats;*

*a detection point providing process of providing a plurality of points for detection in said time progress, said points being allotted in sequence along said progression of the musical performance;*

*a tone pitch detection process of detecting, at one point after another among said points, a tone pitch or pitches of at least one inputted tone pitch information data existing at each detection point;*

*an analysis process, performing a plurality of different analyzing algorithms depending on said different timings, for analyzing the tone pitch information data based on the musical timing using one of said analyzing algorithms which corresponds to said musical timing as the detection point to determine which of a plurality of performance parts each of said detected tone pitches belongs to, wherein the plurality of performance parts comprise a bass part, a bass chord part, a melody chord part and a melody part; and*

*an analysis result storing process of storing data indicating the determined performance part for each of the analyzed tone pitches.*

*48. A machine readable medium for use in a system of a data processing type comprising a computer, for analyzing tone pitch information representing tones which constitute a progression of a musical performance to determine which one of a plurality of performance parts each of the tones in the progression belongs to, said medium containing program instructions executable by said computer for executing:*

*an input process of receiving tone pitch information data representative of tone pitches which constitute a progression of a musical performance to be analyzed, wherein which one of a plurality of performance parts to which each of said tone pitches belongs to is undetermined;*

*a detection point providing process of providing a plurality of points for detection allotted in sequence along said progression of the musical performance;*

*a tone pitch detection process of detecting, at one point after another among said points, a tone pitch or pitches of at least one inputted tone pitch information data existing at each detection point;*

*an analysis process, performing at least one analyzing algorithm, for analyzing the tone pitch information data using said analyzing algorithm to determine which of a plurality of performance parts each of said detected tone pitches belongs to, wherein the plurality of performance parts comprise a bass part, a bass chord part, a melody chord part and a melody part;*

*an analysis result storing process of storing data indicating the determined performance part for each of the analyzed tone pitches; and*

*a chord detecting process, performing a chord detection algorithm, for detecting a chord based on the analyzed tone pitches in the respectively determined performance parts using said chord detection algorithm wherein said chord detection algorithm is such that the chord detection is made based on the tone pitches which have been determined to belong to said chord part as long as said tone pitches which have been determined to belong to said chord part are sufficient for detecting a chord and if not the chord detection is made based on the tone pitches of the chord part and the tone pitches of any other performance parts in combination.*

*49. A machine readable medium for use in a system of a data processing type comprising a computers for analyzing tone pitch information representing tones which constitute a progression of a musical performance to determine which one of a plurality of performance parts each of the tones in the progression belongs to, said medium containing program instructions executable by said computer for executing:*

*an input process of receiving tone pitch information data representative of tone pitches which constitute a pro-*

*gression of a musical performance to be analyzed, wherein which one of a plurality of performance parts to which each of said tone pitches belongs to is undetermined;*

*a detection point providing process of providing a plurality of points for detection allotted in sequence along said progression of the musical performance;*

*a tone pitch detection process of detecting, at one point after another among said points, a tone pitch or pitches of at least one inputted tone pitch information data existing at each detection point;*

*an analysis process, performing at least one analyzing algorithm, for analyzing the tone pitch information data using said analyzing algorithm to determine which of a plurality of performance parts each of said detected tone pitches belongs to, wherein the plurality of performance parts comprise a bass part, a bass chord part, a melody chord part and a melody part;*

*an analysis result storing process of storing data indicating the determined performance part for each of the analyzed tone pitches; and*

*a chord detecting process, performing a chord detection algorithm, for detecting a chord based on the analyzed tone pitches in the respectively determined performance parts using said chord detection algorithm, wherein said chord detection algorithm is such that, in case both of the tone pitches analyzed to be in the bass chord part and the tone pitches analyzed to be in the melody chord part have sufficient information for detecting chords, respectively, the tone pitches analyzed to be in the bass chord part are used in preference to the tone pitches analyzed to be in the melody chord part in detecting a chord.*

*50. A method for analyzing tone pitch information representing tones which constitute a progression of a musical performance to determine which one of a plurality of performance parts each of the tones in the progression belongs to, comprising the steps of:*

*inputting a plurality of tone pitch information data representative of tone pitches which constitute a progression of a musical performance to be analyzed, wherein which one of a plurality of performance parts to which each of said tone pitches belongs to is undetermined;*

*providing a plurality of points for detection allotted in sequence along said progression of the musical performance;*

*detecting, at one point after another among said points, a tone pitch or pitches of at least one inputted tone pitch information data existing at each detection point;*

*analyzing the tone pitch information data using at least one analyzing algorithm to determine which of a plurality of performance parts each of said detected tone pitches belongs to, wherein the plurality of performance parts comprise a bass part, a chord part and a melody part; and*

*storing data indicating the determined performance part for each of the analyzed tone pitches obtained as a result of the analyzing step;*

*said analyzing algorithm including a step of comparing the tone pitch under analysis with the data of a previous analysis result stored in said storing step.*

*51. A method for analyzing tone pitch information representing tones which constitute a progression of a musical performance to determine which one of a plurality of performance parts each of the tones in the progression belongs to, comprising the steps of:*

*inputting tone pitch information data representative of tone pitches which constitute a progression of a musical performance to be analyzed, wherein which one of a plurality of performance parts to which each of said tone pitches belongs to is undetermined;*

*providing a plurality of points for detection allotted in sequence along said progression of the musical performance;*

*detecting, at one point after another among said points, a tone pitch or pitches of at least one inputted tone pitch information data existing at each detection point;*

*detecting the number of tone pitches as detected by said tone pitch detection process at said each detection point;*

*providing a plurality of analyzing algorithms depending on the number of detected tone pitches;*

*analyzing the tone pitch information data based on the detected number of tone pitches using one of said analyzing algorithms which corresponds to said detected number of tone pitches at each detection point to determine which of a plurality of performance parts each of said detected tone pitches belongs to, wherein the plurality of performance parts comprise a bass part, a chord part and a melody part; and*

*storing data indicating the determined performance part for each of the analyzed tone pitches obtained as a result of the analyzing step.*

*52. A method for analyzing tone pitch information representing tones which constitute a progression of a musical performance to determine which one of a plurality of performance parts each of the tones in the progression belongs to, comprising the steps of:*

*inputting tone pitch information data representative of tone pitches which constitute a progression of a musical performance to be analyzed wherein which one of a plurality of performance parts to which each of said tone pitches belongs to is undetermined;*

*providing a plurality of points for detection allotted in sequence along said progression of the musical performance;*

*detecting, at one point after another among said points a tone pitch or pitches of at least one inputted tone pitch information data existing at each detection point;*

*analyzing the tone pitch information data using at least one analyzing algorithm to determine which of a plurality of performance parts each of said detected tone pitches belongs to, wherein the plurality of performance parts comprise a bass part a chord part and a melody part; and*

*storing data indicating the determined performance part for each of the analyzed tone pitches obtained as a result of the analyzing step;*

*said at least one analyzing algorithm being for analyzing the tone pitch information data in case more than one tone pitches are detected at a time, said analyzing algorithm is to first determine temporarily the performance part to which one of said more than one tone pitches belongs and next to determine the performance part for all of said more than one tone pitches with reference to said temporarily determined performance part for said one of said more than one tone pitches wherein said temporarily determined performance part may be changed to another performance part in case a better assignment should be found in the course of analyzing the rest of said more than one tone pitches.*

*53. A method for analyzing tone pitch information representing tones which constitute a progression of a musical performance to determine which one of a plurality of performance parts each of the tones in the progression belongs to, comprising the steps of:*

*inputting tone pitch information data representative of tone pitches which constitute a progression of a musical performance to be analyzed wherein which one of a plurality of performance parts to which each of said tone pitches belongs to is undetermined;*

*defining a time progress with respect to said progression of a musical performance to be analyzed said time progress including musically different timings of measure heads, strong beats and weak beats;*

*providing a plurality of points for detection in said time progress said points being allotted in sequence along said progression of the musical performance;*

*detecting, at one point after another among said points a tone pitch or pitches of at least one inputted tone pitch information data existing at each detection point;*

*providing a plurality of different analyzing algorithms depending on said different timings;*

*analyzing the tone pitch information data based on the musical timing using one of said analyzing algorithms which corresponds to said musical timing as the detection point to determine which of a plurality of performance parts each of said detected tone pitches belongs to, wherein the plurality of performance parts comprise a bass part a chord part and a melody part; and*

*storing data indicating the determined performance part for each of the analyzed tone pitches obtained as a result of the analyzing step.*

*54. A method for analyzing tone pitch information representing tones which constitute a progression of a musical performance to determine which one of a plurality of performance parts each of the tones in the progression belongs to, comprising the steps of:*

*inputting tone pitch information data representative of tone pitches which constitute a progression of a musical performance to be analyzed, wherein which one of a plurality of performance parts to which each of said tone pitches belongs to is undetermined;*

*providing a plurality of points for detection allotted in sequence along said progression of the musical performance;*

*detecting, at one point after another among said points, a tone pitch or pitches of at least one inputted tone pitch information data existing at each detection point;*

*analyzing the tone pitch information data using at least one analyzing algorithm to determine which of a plurality of performance parts each of said detected tone pitches belongs to, wherein the plurality of performance parts comprise a bass part, a chord part and a melody part;*

*storing data indicating the determined performance part for each of the analyzed tone pitches obtained as a result of the analyzing step; and*

*detecting a chord based on the analyzed tone pitches in the respectively determined performance parts using a chord detection algorithm, wherein said chord detection algorithm is such that the chord detection is made based on the tone pitches which have been determined to belong to said chord part as long as said tone pitches which have been determined to belong to said chord part are sufficient for detecting a chord and if not the chord detection is made based on the tone pitches of the chord part and the tone pitches of any other performance parts in combination.*

*55. A method for analyzing tone pitch information representing tones which constitute a progression of a musical performance to determine which one of a plurality of performance parts each of the tones in the progression belongs to, comprising the steps of:*

*inputting tone pitch information data which constitute a progression of a musical performance to be analyzed, wherein which one of a plurality of performance parts to which each of said tone pitches belongs to is undetermined;*

*providing a plurality of points for detection allotted in sequence along said progression of the musical performance;*

*detecting, at one point after another among said points, a tone pitch or pitches of at least one inputted tone pitch information data existing at each detection point;*

*analyzing the tone pitch information data using at least one analyzing algorithm to determine which of a plurality of performance parts each of said detected tone pitches belongs to, wherein the plurality of performance parts comprise a bass part, a bass chord part, a melody chord part and a melody part; and*

*storing data indicating the determined performance part for each of the analyzed tone pitches obtained as a result of the analyzing step.*

*56. A method for analyzing tone pitch information representing tones which constitute a progression of a musical performance to determine which one of a plurality of performance parts each of the tones in the progression belongs to, comprising the steps of:*

*inputting tone pitch information data representative of tone pitches which constitute a progression of a musical performance to be analyzed, wherein which one of a plurality of performance parts to which each of said tone pitches belongs to is undetermined;*

*providing a plurality of points for detection allotted in sequence along said progression of the musical performance;*

*detecting, at one point after another among said points, a tone pitch or pitches of at least one inputted tone pitch information data existing at each detection point;*

*analyzing the tone pitch information data using at least one analyzing algorithm to determine which of a plurality of performance parts each of said detected tone pitches belongs to, wherein the plurality of performance parts comprise a bass part, a bass chord part, a melody chord part and a melody part; and*

*storing data indicating the determined performance part for each of the analyzed tone pitches obtained as a result of the analyzing step;*

*said analyzing algorithm including a step of comparing the tone pitch under analysis with the data of a previous analysis result stored in said storing step.*

*57. A method for analyzing tone pitch information representing tones which constitute a progression of a musical performance to determine which one of a plurality of performance parts each of the tones in the progression belongs to comprising the steps of:*

*inputting a plurality of tone pitch information data representative of tone pitches which constitute a progression of a musical performance to be analyzed wherein which one of a plurality of performance parts to which each of said tone pitches belongs to is undetermined;*

*providing a plurality of points for detection allotted in sequence along said progression of the musical performance;*

*detecting, at one point after another among said points, a tone pitch or pitches of at least one inputted tone pitch information data existing at each detection point;*

*detecting the number of tone pitches as detected by said tone pitch detection process at said each detection point;*

*providing a plurality of analyzing algorithms depending on the number of detected tone pitches;*

*analyzing the tone pitch information data based on the detected number of tone pitches using one of said analyzing algorithms which corresponds to said detected number of tone pitches at each detection point to determine which of a plurality of performance parts each of said detected tone pitches belongs to wherein the plurality of performance parts comprise a bass part a bass chord part, a melody chord part and a melody part; and*

*storing data indicating the determined performance part for each of the analyzed tone pitches obtained as a result of the analyzing step.*

*58. A method for analyzing tone pitch information representing tones which constitute a progression of a musical performance to determine which one of a plurality of performance parts each of the tones in the progression belongs to comprising the steps of:*

*inputting tone pitch information data representative of tone pitches which constitute a progression of a musical performance to be analyzed, wherein which one of a plurality of performance parts to which each of said tone pitches belongs to is undetermined;*

*providing a plurality of points for detection allotted in sequence along said progression of the musical performance;*

*detecting, at one point after another among said points, a tone pitch or pitches of at least one inputted tone pitch information data existing at each detection point;*

*analyzing the tone pitch information data using at least one analyzing algorithm to determine which of a plurality of performance parts each of said detected tone pitches belongs to wherein the plurality of performance parts comprise a bass part, a bass chord part, a melody chord part and a melody part; and*

*storing data indicating the determined performance part for each of the analyzed tone pitches obtained as a result of the analyzing step;*

*said at least one analyzing algorithm being for analyzing the tone pitch information data in case more than one tone pitches are detected at a time, said analyzing algorithm is to first determine temporarily the performance part to which one of said more than one tone pitches belongs and next to determine the performance part for all of said more than one tone pitches with reference to said temporarily determined performance part for said one of said more than one tone pitches, wherein said temporarily determined performance part may be changed to another performance part in case a better assignment should be found in the course of analyzing the rest of said more than one tone pitches.*

*59. A method for analyzing tone pitch information representing tones which constitute a progression of a musical performance to determine which one of a plurality of performance parts each of the tones in the progression belongs to, comprising the steps of:*

*inputting tone pitch information data representative of tone pitches which constitute a progression of a musical performance to be analyzed, wherein which one of a plurality of performance parts to which each of said tone pitches belongs to is undetermined;*

*defining a time progress with respect to said progression of a musical performance to be analyzed said time progress including musically different timings of measure heads, strong beats and weak beats;*

*providing a plurality of points for detection in said time progress, said points being allotted in sequence along said progression of the musical performance;*

*detecting, at one point after another among said points, a tone pitch or pitches of at least one inputted tone pitch information data existing at each detection point;*

*providing a plurality of different analyzing algorithms depending on said different timings;*

*analyzing the tone pitch information data based on the musical timing using one of said analyzing algorithms which corresponds to said musical timing as the detection point to determine which of a plurality of performance parts each of said detected tone pitches belongs to, wherein the plurality of performance parts comprise a bass part, a bass chord part, a melody chord part and a melody part; and*

*storing data indicating the determined performance part for each of the analyzed tone pitches obtained as a result of the analyzing step.*

*60. A method for analyzing tone pitch information representing tones which constitute a progression of a musical performance to determine which one of a plurality of performance parts each of the tones in the progression belongs to, comprising the steps of:*

*inputting tone pitch information data representative of tone pitches which constitute a progression of a musical performance to be analyzed, wherein which one of a plurality of performance parts to which each of said tone pitches belongs to is undetermined;*

*providing a plurality of points for detection allotted in sequence along said progression of the musical performance;*

*detecting, at one point after another among said points, a tone pitch or pitches of at least one inputted tone pitch information data existing, at each detection point;*

*analyzing the tone pitch information data using at least one analyzing algorithm to determine which of a plurality of performance parts each of said detected tone pitches belongs to wherein the plurality of performance parts comprise a bass part, a bass chord part, a melody chord part and a melody part;*

*storing data indicating the determined performance part for each of the analyzed tone pitches obtained as a result of the analyzing step; and*

*detecting a chord based on the analyzed tone pitches in the respectively determined performance parts using a chord detection algorithm, wherein said chord detection algorithm is such that the chord detection is made based on the tone pitches which have been determined to belong to either of said chord parts as long as said tone pitches which have been determined to belong to said chord part are sufficient for detecting a chord and if not the chord detection is made based on the tone pitches of the chord part and the tone pitches of any other performance parts in combination.*

*61. A method for analyzing tone pitch information representing tones which constitute a progression of a musical*

*performance to determine which one of a plurality of performance parts each of the tones in the progression belongs to, comprising the steps of:*

*inputting tone pitch information data representative of tone pitches which constitute a progression of a musical performance to be analyzed, wherein which one of a plurality of performance parts to which each of said tone pitches belongs to is undetermined;*

*providing a plurality of points for detection allotted in sequence along said progression of the musical performance;*

*detecting, at one point after another among said points, a tone pitch or pitches of at least one inputted tone pitch information data existing at each detection point;*

*analyzing the tone pitch information data using at least one analyzing algorithm to determine which of a plurality of performance parts each of said detected tone pitches belongs to, wherein the plurality of performance parts comprise a bass part, a bass chord part, a melody chord part and a melody part;*

*storing data indicating the determined performance part for each of the analyzed tone pitches obtained as a result of the analyzing step; and*

*detecting a chord based on the analyzed tone pitches in the respectively determined performance parts using a chord detection algorithm, wherein said chord detection algorithm is such that in case both of the tone pitches analyzed to be in the bass chord part and the tone pitches analyzed to be in the melody chord part have sufficient information for detecting chords, respectively, the tone pitches analyzed to be in the bass chord part are used in preference to the tone pitches analyzed to be in the melody chord part in detecting a chord.*

*62. A performance information analyzer as claimed in one of claims 11, 12, 19 and 20, wherein:*

*said one of said more than one tone pitches is the lowest tone pitch of said more than one tone pitches.*

* * * * *